United States Patent
Shrestha et al.

(10) Patent No.: US 11,129,104 B2
(45) Date of Patent: Sep. 21, 2021

(54) WAKE UP SIGNALING IN WIRELESS TELECOMMUNICATION NETWORKS

(71) Applicant: Apple Inc., Cupertino, CA (US)

(72) Inventors: Bharat Shrestha, Hillsboro, OR (US); Maruti Gupta Hyde, Portland, OR (US); Qiaoyang Ye, Fremont, CA (US); Timothy Cox, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 16/638,322

(22) PCT Filed: Aug. 13, 2018

(86) PCT No.: PCT/US2018/046535
§ 371 (c)(1),
(2) Date: Feb. 11, 2020

(87) PCT Pub. No.: WO2019/033112
PCT Pub. Date: Feb. 14, 2019

(65) Prior Publication Data
US 2020/0229095 A1 Jul. 16, 2020

Related U.S. Application Data

(60) Provisional application No. 62/670,647, filed on May 11, 2018, provisional application No. 62/583,347, (Continued)

(51) Int. Cl.
*H04W 52/02* (2009.01)
*H04W 4/70* (2018.01)
(Continued)

(52) U.S. Cl.
CPC ......... *H04W 52/0235* (2013.01); *H04W 4/70* (2018.02); *H04W 8/08* (2013.01);
(Continued)

(58) Field of Classification Search
CPC ... H04W 52/0235; H04W 4/70; H04W 76/11; H04W 8/08; H04W 8/24; H04W 52/0216;
(Continued)

(56) References Cited

U.S. PATENT DOCUMENTS

| 2013/0044709 A1 | 2/2013 | Adjakple et al. |
| 2017/0064670 A1 | 3/2017 | Shen et al. |
| 2018/0352416 A1* | 12/2018 | Ryu ........................ H04W 4/70 |

FOREIGN PATENT DOCUMENTS

WO 2016/072770 A1 5/2016

OTHER PUBLICATIONS

Raza, Muhammad Taqi, et al. "Rethinking LTE network functions virtualization." 2017 IEEE 25th International Conference on Network Protocols (ICNP). IEEE, 2017. (Year: 2017).*
(Continued)

*Primary Examiner* — Sharad Rampuria
(74) *Attorney, Agent, or Firm* — Eschweiler & Potashnik, LLC

(57) ABSTRACT

A telecommunication network may operate to enable a wake up signals (WUSs) within the telecommunication network. A mobility management entity (MME) may estimate a coverage enhancement (CE) level of a user equipment (UE), determine, based on the CE level, a number of repetitions for a wake up signal (WUS) for the UE, and cause a WUS for UE to be transmitted to a radio access network (RAN) node corresponding to the UE. The RAN node may inform the MME that the RAN node has disabled the WUS feature, and may cause system information to be broadcast to UEs in IDLE mode, indicating that the WUS feature of the RAN node has been disabled. A UE may determine a paging occasion (PO) determine a maximum WUS duration, minimum offset, and start location of the WUS.

21 Claims, 14 Drawing Sheets

Related U.S. Application Data filed on Nov. 8, 2017, provisional application No. 62/564,976, filed on Sep. 28, 2017, provisional application No. 62/544,276, filed on Aug. 11, 2017.

(51) Int. Cl.
| | |
|---|---|
| *H04W 76/11* | (2018.01) |
| *H04W 8/08* | (2009.01) |
| *H04W 8/24* | (2009.01) |
| *H04W 68/00* | (2009.01) |

(52) U.S. Cl.
CPC ......... *H04W 8/24* (2013.01); *H04W 52/0216* (2013.01); *H04W 68/005* (2013.01); *H04W 76/11* (2018.02)

(58) Field of Classification Search
CPC ..... H04W 68/005; H04W 48/12; H04W 4/21; H04W 76/28; H04W 4/06; H04W 72/04; H04W 72/12; H04W 76/00; Y02D 30/70; H04B 7/2121; H04B 7/2123; H04J 2203/0069; H04Q 2213/394
See application file for complete search history.

(56) References Cited

OTHER PUBLICATIONS

International Preliminary Report on Patentability dated Feb. 11, 2020 for International Application No. PCT/US2018/046535.

International Search Report dated Oct. 31, 2018 for International Application No. PCT/US2018/046535.

"Report of email discussion [99bis#35][NB-Iot/MTC] on wake-up signal." Source: Huawei. Agenda Item: 9.13.9. 3GPP-TSG-RAN WG2 Meeting#100, Reno, USA, Nov. 27-Dec. 1, 2017. R2-1713186. 13 pages.

"Power saving signal for efeMTC." Source: Intel Corporation. Agenda Item: 6.2.6.3. 3GPP TS RAN WG1 Meeting #93, Busan, Korea, May 21-May 25, 2018. R1-1806489. 11 pages.

3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.3.0 (Sep. 2017). pp. 1-138.

3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.3.0 (Sep. 2017). pp. 139-262.

3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.3.0 (Sep. 2017). pp. 263-414.

3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.3.0 (Sep. 2017). pp. 415-568.

3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.3.0 (Sep. 2017). pp. 569-745.

* cited by examiner

WAKE UP SIGNALING IN WIRELESS TELECOMMUNICATION NETWORKS

RELATED APPLICATIONS

This application is a National Phase entry application of International Patent Application No. PCT/US2018/046535 filed Aug. 13, 2018, which claims priority to U.S. Provisional Patent Application No. 62/544,276, which was filed on Aug. 11, 2017, U.S. Provisional Patent Application No. 62/564,976, which was filed on Sep. 28, 2017, of U.S. Provisional Patent Application No. 62/583,347, which was filed on Nov. 8, 2017, and of U.S. Provisional Patent Application No. 62/670,647, which was filed on May 11, 2018, and is hereby incorporated by reference in its entirety.

BACKGROUND

Wireless telecommunication networks may include user equipment (UE) (e.g., smartphones, tablet computers, laptop computers, etc.) radio access networks (RANs) (that often include one or more base stations), and a core network. A UE may connect to the core network by communicating with the RAN and registering with the core network. Communications between the UE and the RAN may occur over one or more wireless channels. Among the processes and procedures that may relate to communications between UEs and RANs are those relating to paging and wake up signals (WUS), whereby a RAN node may prompt the UE to exit an idle mode.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

Figure 1:
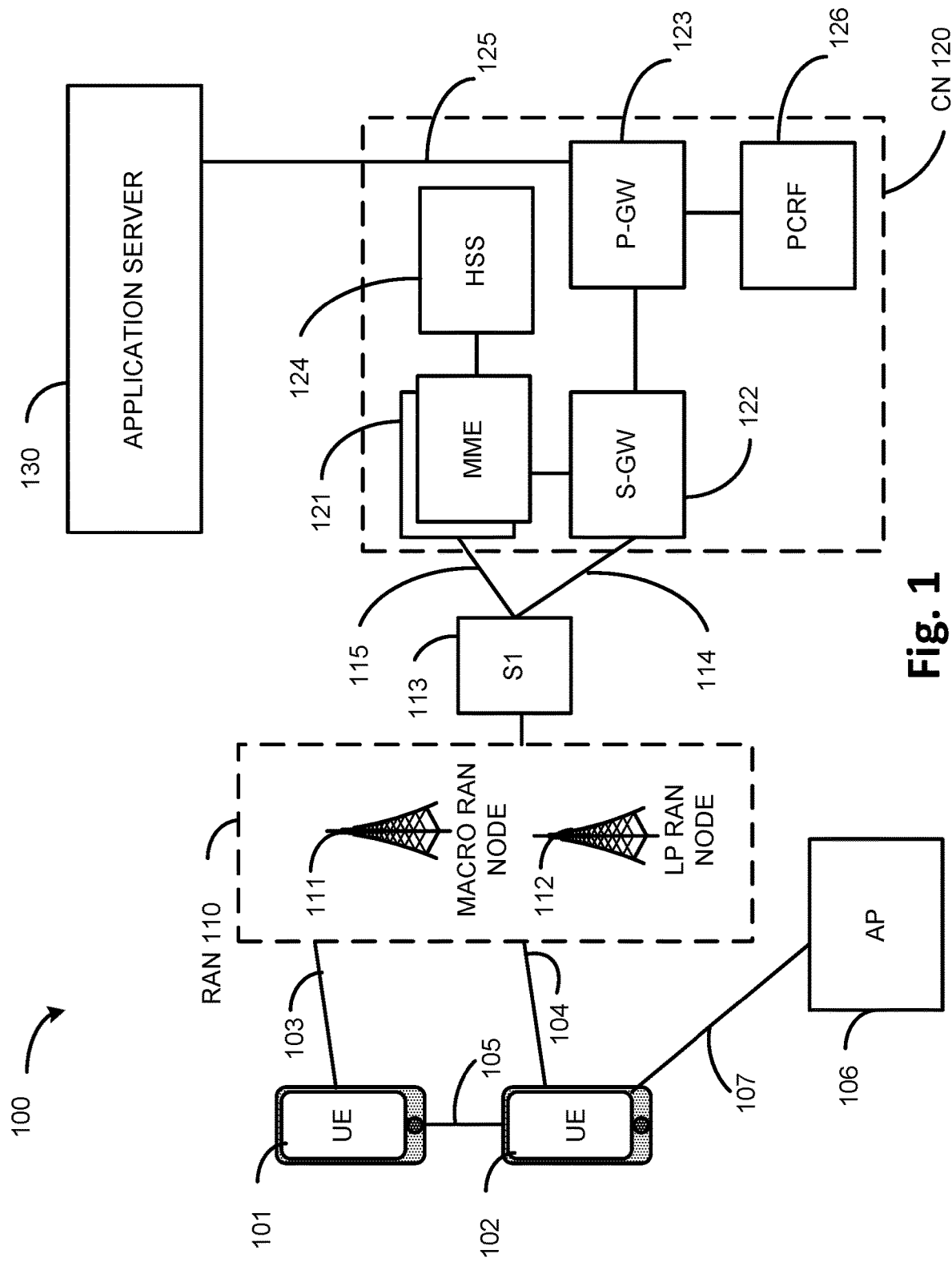
FIG. 1 illustrates an architecture of a system of a network in accordance with some embodiments.

The following detailed description refers to the accompanying drawings. The same reference numbers in different drawings may identify the same or similar elements. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The techniques, described herein, may help ensure that wake-up signaling (WUS) is efficient and effective by determining a proper number of wake up signaling (WUS) repetitions to be used to for a given user equipment (UE) based on a coverage enhancement (CE) level, mobility status, etc., of the UE. A radio access network (RAN) node may use a WUS to notify UEs in IDLE mode whether the UEs are wake up to decode the control channel either during IDLE mode (e.g., to read a paging message) or during an ON duration of discontinuous reception (DRX) cycles, in a radio resource control (RRC) Connected state, to monitor the control channel for an uplink (UL)/downlink (DL) grant. The WUS may be much simpler, lower complexity signal that can be decoded much faster than the physical downlink control channel (PDCCH) and may thus save energy for low-power, low-complexity UEs, such as enhanced and further enhancements machine-type-communication (eFeMTC) UEs and/or narrowband internet-of-things (NB-IoT) UEs.

Both efeMTC and NB-IoT UEs have been designed so as to operate at different coverage levels namely at the normal long-term evolution (LTE) coverage of maximum coupling loss (MCL) of 144 decibels (dB), and the extended coverage modes at 154 and 164 dB. To be able to operate at such extended range, the RAN node must repeat the message several times for UEs to be able to receive the data at the expected Block Error Rate (BLER). Currently, there are mechanisms in place whereby it is possible for the RAN node to be aware of the UE's coverage level during RRC_connected state, but not during the RRC_idle state. Accordingly, the techniques described herein may enable the RAN node 111 and core network to remain aware of a UE's coverage level, determine an appropriate number of repetitions for transmitting a WUS based on, for example, the coverage level of the UE, and transmit WUSs to the UE accordingly.

For example, when a UE is released to IDLE mode, a radio access network (RAN) node (e.g., a base station) may send core network elements, such as the mobility management entity (MME) pertinent UE information related to the WUS (e.g., the UE's coverage level, number of WUS repetitions required, the UE's mobility status, etc.) during the connection establishment and/or connection release process. This may enable the MME to obtain and store the information required for the coverage level.

At some point, the MME may estimate the coverage information of the UE based on the existing information regarding coverage levels, UE's mobility status, etc. The core network may then send this information to the RAN node during the paging process to enable RAN nodes to decide the most optimal coverage level for the message and proceed to transmit the WUS accordingly. Generally, a RAN node may receive requests for multiple UEs to be paged at a given paging occasion (PO). The RAN node may determine to send the WUS to UEs based on, for example, the coverage level information of not only the UEs to be paged but also the overall number of UEs listening to the WUS in the cell, and the importance of the UEs listening to the WUS to be able to decode the WUS even if they are not the intended recipient of the WUS. This can be a computationally intensive process since it may involve the RAN node keeping track of all the international mobile subscriber identities (IMSI) or S-TMSI (SAE-Temporary Mobile Subscriber Identity) of the machine type communication (MTC)/narrowband internet of things (NB-IoT) UEs and their corresponding coverage levels. Additional techniques, described herein, may include the MME determining the number of repetitions for transmitting the WUS to UEs, enabling and disabling WUS services, and configuring a single WUS to be applicable to multiple POs.

FIG. 1 illustrates an architecture of a system 100 of a network in accordance with some embodiments. The system 100 is shown to include UE 101 and a UE 102. The UEs 101 and 102 are illustrated as smartphones (e.g., handheld touch-screen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE or Narrowband (NB-IoT) UE, which can comprise a network access layer designed for low-power IoT applications utilizing short-lived UE connections. An IoT UE can utilize technologies such as machine-to-machine (M2M), machine-type communications (MTC), enhanced MTC, for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, eNBs, next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks, illustrated in FIG. 1, is provided for explanatory purposes only. In practice, system 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of system 100 may perform one or more functions described as being performed by another one or more of the devices of system 100. Additionally, the devices of system 100 may interconnect with each other and/or other devices via wired connections, wireless connections, or a combination of wired and wireless connections. In some embodiments, one or more devices of system 100 may be physically integrated in, and/or may be physically attached to, one or more other devices of system 100. Also, while "direct" connections may be shown between certain devices in FIG. 1, some of said devices may, in practice, communicate with each other via one or more additional devices and/or networks.

Figure 2:
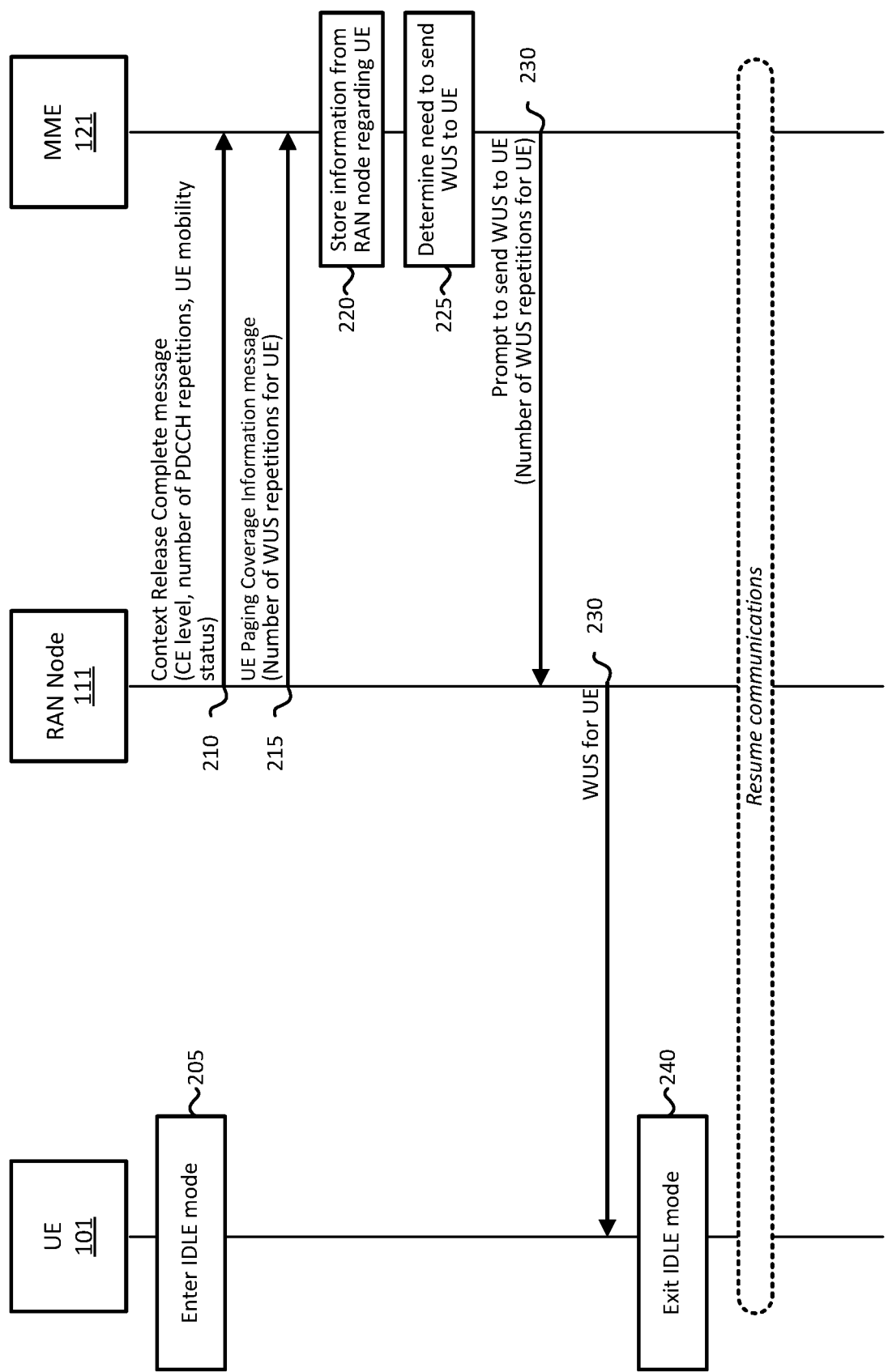
FIG. 2 is a sequence flow diagram of an example process for communicating a wake up signal (WUS) to user equipment (UE)

FIG. 2 is a sequence flow diagram of an example process 200 for communicating a WUS to UE 101. As shown, the example of FIG. 2 may include UE 101, RAN node 111, and MME 121. The example of FIG. 2 is provided as a non-limiting example. In practice, the example of FIG. 2 may include fewer, additional, alternative, operations or functions. Additionally, one or more of the operations or functions of FIG. 2 may be performed by fewer, additional, or alternative devices, which may include one or more of the devices described above with reference to FIG. 1.

As shown, when a UE is released to IDLE mode (at 205), RAN node 111 may send a context release complete message to a mobility management entity (MME). At this time, the RAN node can also provide the latest information of the CE level in the context release complete message to the MME 121 (210). The CE level information may include the number of repetitions for a physical downlink control channel (PDDCH) (e.g., machine type communication (MTC) physical downlink control channel (MPDCCH), narrowband PDCCH (NPDCCH), or the like, or combinations thereof).

RAN node 111 may also provide MME 121 with a number of repetitions to be used to for a subsequent WUS to UE 101 (at 215). As such, for WUS capable UEs 101, RAN node 111 may estimate the number of repetitions to be used for UE 101, which may be based on how the design of the WUS repetitions are mapped to the coverage level. For example, sending the WUS for coverage level 1, may include repetition (R max)/16 repetitions, which may be part of system information. The RAN node may add this information in a UE paging coverage information message as shown below. This message can be part of a S1 Application Protocol (S1AP) UE Context Release message exchange between RAN node and the MME.

Table 1 includes an example of a UE paging coverage information message that may be used by RAN node 111 to provide MME 121 with coverage information and/or a number of WUS repetitions for UE 101.

TABLE 1

UEPagingCoverageInformation Message
UEPagingCoverageInformation

```
-- ASN1START
UEPagingCoverageInformation ::= SEQUENCE {
        criticalExtensions                              CHOICE {
        c1
        CHOICE
uePagingCoverageInformation-r13
        UEPagingCoverageInformation-r13-IEs,
            spare7 NULL,
                spare6 NULL, spare5 NULL, spare4 NULL,
                spare3 NULL, spare2 NULL, spare1 NULL
        },
        criticalExtensionsFuture        SEQUENCE { }
        }
}
UEPagingCoverageInformation-r13-IEs ::= SEQUENCE {
        mpdcch-NumRepetition-r13        INTEGER (1..256)        OPTIONAL,
        nonCriticalExtension            WUSCoverageInformation-r15-IEs        OPTIONAL
}
WUSCoverageInformation-r15-IEs ::= SEQUENCE {
        wus-NumRepetition-r15           INTEGER (1..256)        OPTIONAL,
        nonCriticalExtension            SEQUENCE { }            OPTIONAL
}
-- ASN1STOP
```

Table 2 includes an example of fields of a UE paging coverage information message that may be used by RAN node 111 to provide MME 121 with a number of WUS repetitions for UE 101.

TABLE 2

UEPagingCoverageInformation Field Descriptions
UEPagingCoverageInformation Field Descriptions mpdcch-NumRepetition
Number of repetitions for MPDCCH. The value is an estimate of the required number of repetitions for MPDCCH for paging.
wus-NumRepetition
Number of repetitions for WUS. The value is an estimate of the required number of repetitions for WUS for paging notification.

Table 3 includes an example of a UE paging coverage information message that may be used by RAN node 111 to provide MME 121 with coverage information and/or a number of WUS repetitions for a narrowband UE 101 (e.g., a NB-IoT device).

TABLE 3

UEPagingCoverageInformation-NB Message
UEPagingCoverageInformation-NB Message

```
-- ASN1START
UEPagingCoverageInformation-NB ::= SEQUENCE {
    criticalExtensions              CHOICE {
    c1                                              CHOICE{
        uePagingCoverageInformation-r13
    UEPagingCoverageInformation-NB-IEs,
        spare3 NULL, spare2 NULL, spare 1 NULL
    },
    criticalExtensionsFuture    SEQUENCE { }
    }
}
UEPagingCoverageInformation-NB-IEs ::= SEQUENCE {
--  the possible value(s) can differ from those sent on Uu
    npdcch-NumRepetitionPaging-r13  INTEGER (1..2048)   OPTIONAL,
    nonCriticalExtension            WUSCoverageInformation-NB-r15-IEs
    OPTIONAL
}
WUSCoverageInformation-NB-r15-IEs ::= SEQUENCE {
    wus-NumRepetition-NB-r15    INTEGER (1.. 1024)  OPTIONAL,
    nonCriticalExtension        SEQUENCE { }        OPTIONAL
}
-- ASN1STOP
```

Table 4 includes an example of fields of a UE paging coverage information NB message that may be used by RAN node 111 to provide MME 121 with a number of WUS repetitions for a NB UE 101.

TABLE 4

UEPagingCoverageInformation-NB Field Descriptions
UEPagingCoverageInformation-NB Field Descriptions npdcch-NumRepetitionPaging
Number of repetitions for NPDCCH, see TS 36.211 [21]. This
value is an estimate of the required number of repetitions for NPDCCH.
wus-NumRepetition-NB
Number of repetitions for wake up signal (WUS). The value is an
estimate of the required number of repetitions for WUS for paging notification.

As shown in FIG. 2, MME 121 may store the information from regarding UE 101 (at 220) and at some later point, determine that a WUS is to be send to UE 101 (at 225). As such, MME 121 may send a message, to RAN node 111, that prompts RAN node 111 to transmit a WUS to UE 101. The message from MME 121 may include the number of repetitions that RAN node 111 may use in transmitting the WUS to UE 101. UE 101 may receive the WUS, and in response, exit the IDLE mode (540) and resume communications with RAN node 111, MME 121, and/or other devices of the telecommunications network.

While FIG. 2 provides an example of a process for communicating a WUS to UE 101, the techniques described herein may include other examples that differ from the example of FIG. 2 in one or more ways. For instance, in some embodiments, RAN node 111 may not provide MME 121 with information regarding the CE level, mobility status, and/or WUS repetitions for UE 101. In such a scenario, MME 121 may estimate a CE level for UE 101 and determine an appropriate number of WUS repetitions for UE 101 based on the estimated CE level and corresponding PDCCH (MDPCCH or NPDCCH) repetitions received from RAN node 111. In some embodiments, when there is downlink (DL) data for UE 101, MME 121 may provide an estimated number of repetitions for WUS in a S1AP paging message, which may include the UEPagingCoverageInformation message or UEPagingCoverageInformation-NB message described above.

Another example of a process for communicating a WUS to UE 101, which differs from the example of FIG. 2, may include embodiments where MME 121 estimates the number of WUS repetitions based on CE mode information for Bandwidth reduced Low complexity (BL) UEs or UEs 101 in CE. For BL UEs or UEs in CE, MME 121 may be aware whether the UEs 101 support CE mode B or not. As such, MME 121 may estimate the number of repetitions required for the WUS for a paging notification based on the highest number of repetitions required for CE mode A or B.

In another option, RAN node 111 may provide the highest number of repetitions required for WUS at a given CE level, which may be provided by RAN node 111 to MME 121 using a context release complete message on per UE 101 basis or another S1 AP message as common information to all UEs 101. CE mode A operation may correspond to CE level 0 or 1, and CE mode B operation may correspond to CE level 2 and 3. If UE 101 supports CE mode B, then the number of repetitions for WUS may be based on the CE level 3 whereas if UE 101 does not support CE mode B operation, the number of repetitions for WUS may be based on CE level 1.

MME 121 may also, or alternatively, use both the support for CE mode B and a last CE level that UE 101 was operating in connected mode for estimating the number of WUS repetitions. For example, if UE 101 supports CE mode B but the number of repetitions for MPDCCH or NPDCCH was based on CE level 2, 1, or 0, the number of repetitions for WUS may be based on CE level 2. MME 121 may provide the estimated number of repetitions for WUS to RAN node 111 using the same UEPagingCoverageInformation or UEPagingCoverageInformation-NB message as described above with reference to FIG. 2.

Additionally, or alternatively, MME 121 may estimate the number of repetitions for WUS based on a mobility capability of UE 101. For example, UE 101 may be registered as a low mobility or stationary UE 101. In this case, the estimation by MME 121 may be accurate and MME 121 may estimate the number of WUS repetitions based on one or more of the techniques described above (e.g., based on an estimated CE level of UE 101 and a number of receptions for the corresponding PDCCH (MPDCCH or NPDCCH) or based on the CE mode information for BL UEs or UEs in CE). When UE 101 is not registered as a low mobility or stationary UE, or UE 101 is registered as a high mobility UE, MME 121 may obtain information regarding a change of CE level for UE 101. For example, RAN node 111 may track CE level changes for UE 101 and calculate an average number of repetitions for MPDCCH or NPDCCH used while UE 101 was in connected mode. Based on the average number of repetitions used for MPDCCH or NPDCCH, or based on the worst repetition number used for MPDCCH or NPDCCH, RAN node 111 may estimate the required number of repetitions for WUS and provide this information to MME 121 via the UEPagingCoverageInformation or UEPagingCoverageInformation-NB messages described with reference to FIG. 2.

As another example, MME 121 may determine a number of WUS repetitions based a CE level registration of UE 101. Some stationary NB-IoT UEs 101 operate only in CE level 1, or CE level 2, or CE level 3, or only in two CE levels, or in all CE levels. For example, a NB-IoT UE 101 that may be permanently stationed on the roof of a building, or inside a building with coverage boosting relay, and such UE 101 could be in good coverage and would not require a higher number of WUS repetitions. In such a scenario, every time the NB-IoT UE 101 makes an initial connection to MME 121, it may provide coverage level information to the network based on a Reference Signal Received Power (RSRP) measurement threshold. Therefore, it is possible that the NB-IoT UE 101 could register as having a CE level that is different from a CE level of a previous registration instance.

Table 5 includes an example of a RRC Connection Setup Complete message that UE 101 may use to send register at a particular CE level.

TABLE 5

RRCConnectionSetupComplete Message
RRCConnectionSetupComplete Message

```
RRCConnectionSetupComplete-v1430-IEs ::= SEQUENCE {
    dcn-ID-r14                    INTEGER (0..65535)                    OPTIONAL,
    nonCriticalExtension    RRCConnectionSetupComplete-v15xy-IEs OPTIONAL
}
RRCConnectionSetupComplete-v15xy-IEs ::= SEQUENCE {
    ce-level-support                              ENUMERATED {CElevel-1, CElevel-2, CElevel-
3, CElevel-12, CElevel-23, CElevel-all}         OPTIONAL,
    nonCriticalExtension                        SEQUENCE { }       OPTIONAL
}
```

Table 6 includes an example of fields of a RRC Connection Setup Complete message that UE 101 may use to register at a particular CE level.

TABLE 6

RRCConnectionSetupComplete Field Descriptions
RRCConnectionSetupComplete Field Descriptions attachWithoutPDN-Connectivity
This field may use to indicate that the UE performs an Attach without PDN connectivity procedure, as indicated by the upper layers and specified in TS 24.301 [35].
cp-CIoT-EPS-Optimisation
This field is included when the UE supports the Control plane CIoT EPS Optimization, as indicated by the upper layers, see TS 24.301 [35].
ce-ModeB
Indicates whether the UE supports operation in CE mode B, as specified in TS 36.306 [5].
ce-level-support
If this field is present, it indicates the UE is stationary and the UE operates in the given CE level. CElevel-1 indicates UE operates in CE level 1 and so on.

Table 7 includes an example of a RRC Connection Setup Complete message that a NB-IoT UE 101 may use to send register at a particular CE level.

TABLE 7

RRC Connection Setup Complete Message
RRCConnectionSetupComplete-NB Message

```
-- ASN1START
RRCConnectionSetupComplete-NB ::=    SEQUENCE {
    rrc-TransactionIdentifier                    RRC-TransactionIdentifier,
    criticalExtensions                           CHOICE{
        rrcConnectionSetupComplete-r13           RRCConnectionSetupComplete-NB-r13-IEs,
        criticalExtensionsFuture                 SEQUENCE { }
    }
}
RRCConnectionSetupComplete-NB-r13-IEs ::= SEQUENCE {
    selectedPLMN-Identity-r13                    INTEGER (1..maxPLMN-r11),
    s-TMSI-r13                                   S-TMSI              OPTIONAL,
    registeredMME-r13                            RegisteredMME       OPTIONAL,
    dedicatedInfoNAS-r13                         DedicatedInfoNAS,
    attachWithoutPDN-Connectivity-r13            ENUMERATED {true}   OPTIONAL,
    up-CIoT-EPS-Optimisation-r13                 ENUMERATED {true}   OPTIONAL,
    lateNonCriticalExtension                     OCTET STRING        OPTIONAL,
    nonCriticalExtension                         RRCConnectionSetupComplete-NB-v1430-IEs   OPTIONAL
}
RRCConnectionSetupComplete-NB-v1430-IEs ::= SEQUENCE {
    gummei-Type-r14                              ENUMERATED { mapped}    OPTIONAL,
    dcn-ID-r14                                   INTEGER (0..65535)      OPTIONAL,
    nonCriticalExtension                         RRCConnectionSetupComplete-NB-v15xy-IEs
    OPTIONAL
}
RRCConnectionSetupComplete-NB-v15xy-IEs ::= SEQUENCE {
    ce-level-support                             ENUMERATED {CElevel-1, CElevel-2, CElevel-
3, CElevel-12, CElevel-23, CElevel-all}                  OPTIONAL,
    nonCriticalExtension                         SEQUENCE { }            OPTIONAL
}
-- ASN1STOP
```

Table 8 includes an example of a field of a RRC Connection Setup Complete message that NB-IoT UE 101 may use to register at a particular CE level.

TABLE 8

RRCConnectionSetupComplete Message
RRCConnectionSetupComplete-NB Field Descriptions ce-level-support
If this field is present, it indicates the NB-IoT UE is stationary and the UE operates in the given CE level.
CElevel-1 indicates UE operates in CE level 1 and so on.

When RAN node 111 is aware of the CE level of a stationary UE 101, RAN node 111 may determine the number of repetitions for the PDCCH or NPDCCH or WUS. When RAN node 111 releases UE 101 to IDLE mode, RAN node 111 may inform MME 121 on the correct number of repetitions for the WUS using the same UEPagingCoverageInformation message or UEPagingCoverageInformation-NB message as described above with reference to FIG. 2. Also, RAN node 111 may indicate to MME 121 that UE 101 is a stationary, in addition to the number of repetitions for the corresponding MPDCCH or NPDCCH, the number of WUS repetitions in in an initial message as shown below in Table 9.

TABLE 9

| | Initial UE Message Sent by RAN Node to MME Regarding UE | | | | | |
|---|---|---|---|---|---|---|
| IE/Group Name | Presence | Range | IE type and reference | Semantics description | Criticality | Assigned Criticality |
| Message Type | M | | 9.2.1.1 | | YES | ignore |
| eNB UE S1AP ID | M | | 9.2.3.4 | | YES | reject |
| NAS-PDU | M | | 9.2.3.5 | | YES | reject |
| TAI | M | | 9.2.3.16 | Indicating the Tracking Area from which the UE has sent the NAS message. | YES | reject |
| E-UTRAN CGI | M | | 9.2.1.38 | Indicating the E-UTRAN CGI from which the UE has sent the NAS message. | YES | ignore |
| RRC Establishment Cause | M | | 9.2.1.3a | | YES | ignore |
| S-TMSI | O | | 9.2.3.6 | | YES | reject |
| CSG Id | O | | 9.2.1.62 | | YES | reject |

TABLE 9-continued

Initial UE Message Sent by RAN Node to MME Regarding UE

| IE/Group Name | Presence | Range | IE type and reference | Semantics description | Criticality | Assigned Criticality |
|---|---|---|---|---|---|---|
| GUMMEI | O | | 9.2.3.9 | | YES | reject |
| Cell Access Mode | O | | 9.2.1.74 | | YES | reject |
| GW Transport Layer Address | O | | Transport Layer Address 9.2.2.1 | Indicating GW Transport Layer Address if the GW is collocated with eNB. | YES | ignore |
| Relay Node Indicator | O | | 9.2.1.79 | Indicating a relay node. | YES | reject |
| GUMMEI Type | O | | ENUMERATED (native, mapped, . . .) | | YES | ignore |
| Tunnel Information for BBF | O | | Tunnel Information 9.2.2.3 | Indicating HeNB's Local IP Address assigned by the broadband access provider, UDP port Number. | YES | ignore |
| SIPTO L-GW Transport Layer Address | O | | Transport Layer Address 9.2.2.1 | Indicating SIPTO L-GW Transport Layer Address if the SIPTO L-GW is collocated with eNB. | YES | ignore |
| LHN ID | O | | 9.2.1.92 | | YES | ignore |
| MME Group ID | O | | 9.2.3.44 | | YES | ignore |
| UE Usage Type | O | | INTEGER (0 . . . 255) | | YES | ignore |
| CE-mode-B Support Indicator | O | | 9.2.1.118 | | YES | ignore |
| DCN ID | O | | INTEGER (0 . . . 65535) | | YES | ignore |
| Coverage Level | O | | ENUMERATED (extendedcoverage, . . .) | | YES | ignore |
| Paging-information | O | | 9.2.1.xxx | | YES | ignore |

Table 10 is an example of fields and/or information that may be included in the paging-information IE (see, e.g., Table 9).

TABLE 10

IE Paging Information Sent from RAN node to MME Regarding UE

| IE/Group Name | Presence | Range | IE type and reference | Semantics description |
|---|---|---|---|---|
| Mobility | M | | Enumerated (not supported, . . .) | Indicates the UE is not authorized as mobile UE. |
| NumRepetition | M | | INTEGER (1 . . . 2048) | |

In some embodiments, only UEs 101 for which the WUS is being transmitted may be able to detect the WUS. In other embodiments, all UEs monitoring the given slot for the WUS may be able to detect the WUS (e.g., one or UEs in addition to the UEs for which the WUS is transmitted). The WUS may be transmitted at a coverage level such that not only UEs 101 being paged can detect the WUS but any other UEs monitoring the WUS slot may accurately detect the presence/absence of the WUS message.

In some embodiments, when it doesn't matter whether UEs 101 monitoring the WUS slot are unable to detect the WUS if/when the message is not meant for such UEs 101 (e.g., in scenarios where the WUS is not being used for synchronization purposes), RAN node 111 may only send the WUS at a maximum coverage level of the UEs 101 being paged (e.g., often multiple UEs 101 at different coverage levels (and/or different numbers of WUS repetitions) are being paged at the same time). For instance, MME 121 may provide RAN node 111 with information about paging UEs 101 corresponding to different coverage levels and/or number of WUS repetitions, RAN node 111 may transmit the WUS in accordance with the UE 101 associated with the highest number of WUS repetitions. (e.g., if a first UE 101 is associated with 16 receptions and a second UE 101 is associated with 32 receptions, RAN node 111 may use 32 receptions to transmit the WUS for both UEs).

In some embodiments, if the WUS is also used for synchronization purposes, then RAN node 111 may keep track of which UEs 101 that have the worst coverage level for a given WUS slot (especially when UEs 101 are stationary within the sell) and ensure that the repetitions level corresponding to the WUS slot of such UEs 101 are used.

In some embodiments, one or more network devices (e.g., RAN node 111, MME 121, etc.) may be capable of enabling and/or disabling the WUS services (e.g., operations, processes, procedures, etc.) described herein. In some embodiments, WUS services may be enabled and/or disabled in response to one or more network conditions, triggers, etc., such as a level of network congestions, availability of network resources, instructions originating from a network operator or administrator (e.g., during and/or after network installation, configuration, and deployment), etc. When the network determines to disable WUS services, the network (e.g., RAN node 111) may inform the MME that WUS services are not currently supported, which may, for example, enable MME to make better decisions on correct timings for sending S1AP paging messages to RAN node 111 and retransmission strategies of the S1AP paging messages.

RAN node 111 may also inform UEs 101 in IDLE mode that WUS is disabled. This may be done by a broadcast message with system information (e.g., system information block 1 bandwidth reduced (SIB1-BR), SIB1 narrowband (SIB1-NB), SIB2, SIB2-NB, or SIB14, SIB14-NB). Since disabling WUS may have an impact on UEs 101, RAN node 111 may not perform the enabling or disabling of WUS feature frequently. Additionally, RAN node 111 may disable WUS services in response to one or more triggers, conditions, scenarios, etc., such as a corresponding change in the system information, when there is a change in the extended access barring parameter (e.g., of SIB14), etc.

Additionally, when there is direct indication paging message indicating that WUS services are enabled or disabled in the cell: UE 101 may not need to acquire the system information for this reason and may use the stored or default parameters for paging or WUS. If/when UE 101 needs to acquire system information for this reason, UE 101 may use one or more of the following formulas to determine the system frame number (SFN) to acquire the system information and check whether WUS services are enabled or disabled. NB-IoT UEs 101 may use the formula: (H-SFN*1024+SFN) mod (X* systemInfoModification)=0; and BL UEs 101 and/or UEs 101 in coverage enhancement (CE) may use the formula: SFN mod (X* systemInfoModification)=0. Where H-SFN is . . . , X is >=1, and systemInfoModification is 4096 for NB-IoT UEs 101 and 512 for BL UEs 101 or UEs in CE. The value X may be the system frame number, and systemInfoModification may be a window of the number of radio frames and may be a constant value for a given type of UE 101 (e.g., a NB-IoT UE or BL UE 101).

Additionally, direct indication information may be transmitted on a MPDCCH or NPDCCH using a paging radio network temporary identifier (P-RNTI) but without an associated paging message. For example, a new "WUS-enabled" IE may be used, an example of which is provided below in Table 11. If the "WUS-enabled" bit is set to 1, WUS may be enabled in the cell. If it is set to 0, WUS may be disabled in the cell.

TABLE 11

Direct Indication Information Indicating Whether WUS Services are enabled

| Bit | Direct Indication Information |
| --- | --- |
| 1 | systemInfoModification |
| 2 | etws-Indication |
| 3 | cmas-Indication |
| 4 | eab-ParamModification |
| 5 | systemInfoModification-eDRX |
| 6 | WUS-enabled |
| 7, 8 | Not used, and shall be ignored by UE if received. |

The techniques, described herein, may include enabling a WUS to be applicable to multiple paging occasions (PO) in a paging time window (PTW). In current systems (e.g., LTE systems), UE 101 may wake up for every PO to listen for a paging message directed to UE 101. As descried herein, WUS may be used to enable UE 101 to remain in an IDLE mode until UE 101 detects a WUS, in which case UE 101 may wake up for the next PO and listen for a paging message. In some embodiments, a WUS may only relate to one PO (e.g., UE 101 is to wake up for the next PO). In some embodiments, a WUS may also, or alternatively, relate to multiple POs. For example, one WUS may indicate to UE 101 that UE 101 is to wake up for each of the X number of POs and/or however many POs occur during a paging time window (PTW).

The techniques described herein may include the use of a WUS to notify UE 101 that UE 101 is not to wake up for one or more POs, in which case UE 101 may remain in an IDLE more for a longer period of time.

For scenarios where discontinuous reception (DRX) cycles are shorter than 10.24 seconds in the case of NB-IoT UEs 101, or 5.12 seconds in the case of efeMTC UEs 101, the UE 101 may monitor several POs in a given PTW. Thus, in the case of extended DRX cycles, UE 101 may wake up to check multiple POs (ranging from 1-X) POs within a PTW, where the suggested values of X are 1, 2, 3, and 4. This information regarding WUS applied to multiple POs within a PTW may be conveyed by RAN node 111 to UEs 101 and also to MME 121. To convey the information regarding how many POs within the PTW map to a single WUS, RAN node 111 may use signalling information in one or more IEs, such as the RadioResourceConfigCommon-SIB-NB IE or the RadioResourceConfigCommon IE for efeMTC devices. Examples of these IEs, and the information therein, are provided below in Tables 12-14.

TABLE 12

RadioResourceConfigCommonSIB-NB IE Indicating Multiple POs per WUS
RadioResourceConfigCommonSIB-NB

```
-- ASN1START
RadioResourceConfigCommonSIB-NB-r13 ::=   SEQUENCE{
        rach-ConfigCommon-r13             RACH-ConfigCommon-NB-r13,
        bcch-Config-r13                   BCCH-Config-NB-r13,
        pcch-Config-r13                   PCCH-Config-NB-r13,
        nprach-Config-r13                     NPRACH-ConfigSIB-NB-r13,
        npdsch-ConfigCommon-r13               NPDSCH-ConfigCommon-NB-r13,
        npusch-ConfigCommon-r13               NPUSCH-ConfigCommon-NB-r13,
        dl-Gap-r13                            DL-GapConfig-NB-r13
        OPTIONAL,        -- Need OP
        uplinkPowerControlCommon-r13      UplinkPowerControlCommon-NB-r13,
        ...,
        [[        nprach-Config-v1330     NPRACH-ConfigSIB-NB-v1330  OPTIONAL
                            -- Need OR
        ]]
}
BCCH-Config-NB-r13 ::=                    SEQUENCE{
        modificationPeriodCoeff-r13           ENUMERATED {n16, n32, n64, n128}
}
PCCH-Config-NB-r13 ::=                    SEQUENCE{
        defaultPagingCycle-r13            ENUMERATED {rf128, rf256, rf512, rf1024},
        nB-r13                                ENUMERATED {
                                              fourT, twoT, oneT, halfT, quarterT, one8thT,
                                              one16thT, one32ndT, one64thT, one128thT,
                                              one256thT, one512thT, one1024thT, spare3,
                                              spare2, spare1},
        npdcch-NumRepetitionPaging-r13    ENUMERATED {
                                              r1, r2, r4, r8, r16, r32, r64, r128,
                                              r256, r512, r1024, r2048, spare4, spare3,
                                              spare2, spare1}
        defaultPOsWUS-eDRX-r15            INTEGER { 1..MaxPOsWUS
                                              }
}
-- ASN1STOP
```

Table 13 is an example of fields and/or information that may be included in the RadioResourceConfigCommonSIB-NB IE.

TABLE 13

RadioResourceConfigCommonSIB-NB Field Descriptions
RadioResourceConfigCommonSIB-NB Field Descriptions defaultPagingCycle
Default paging cycle, used to derive 'T' in TS 36.304 [4].
Value rf128 corresponds to 128 radio frames, rf256 corresponds to 256 radio frames and so on.
dl-Gap
Downlink transmission gap configuration for the anchor carrier.
See TS 36.211 [21, 10.2.3.4]. If the field is absent, there is no gap.
modificationPeriodCoeff
Actual modification period, expressed in number of radio frames = modificationPeriodCoeff * defaultPagingCycle.

TABLE 13-continued

RadioResourceConfigCommonSIB-NB Field Descriptions
RadioResourceConfigCommonSIB-NB Field Descriptions n16 corresponds to value 16, n32 corresponds to value 32, and so on. The BCCH modification period should be larger or equal to 40.96 s.
nB
Parameter: nB is used as one of parameters to derive the Paging Frame and Paging Occasion according to TS 36.304 [4]. Value in multiples of 'T' as defined in TS 36.304 [4]. A value of fourT corresponds to 4 * T, a value of twoT corresponds to 2 * T and so on.
npdcch-NumRepetitionPaging
Maximum number of repetitions for NPDCCH common search space (CSS) for paging, see TS 36.213 [23, 16.6].
defaultPOsWUS-eDRX-r15
The maximum number of POs that a UE must monitor or skip monitoring on receiving a Wake-up Signal Table 14 is an example of fields and/or information that may be included in the RadioResourceConfigCommon IE.

TABLE 14

RadioResourceConfigCommon IE
RadioResourceConfigCommon IE

```
PCCH-Config-v1310 ::=                  SEQUENCE{
        paging-narrowBands-r13         INTEGER (1..maxAvailNarrowBands-r13),
        mpdcch-NumRepetition-Paging-r13 ENUMERATED {r1, r2, r4, r8, r16, r32, r64, r128,
                                           r256},
        nB-v1310                       ENUMERATED {one64thT, one128thT,
                                           one256thT}
                                           OPTIONAL           -- Need OR
        defaultPOsWUS-eDRX-r15         INTEGER (1..MaxPOsWUS}
}
```

As mentioned above with reference to associating one WUS with multiple POs, in addition to informing UE 101 about this, RAN node 111 may also information MME 121 regarding the same association of one WUS to multiple POs. Doing so may, for example, enable MME 121 to better determine when to send the S1AP message to UE 101. While this may be signalled using one or more messages pertaining to paging and WUS capability information at MME 121, Tables 15 and 16 includes two examples of how this information could be communicated from RAN node 111 to MME 121 (or vice-versa) using the UEPagingCoverageInformationNB message for NB-IoT UEs 101 and the UEPagingCoverageInformation message for efeMTC UEs 101.

Table 15 is an example of fields and/or information that may be included in the UEPagingCoverageInformation-NB message.

TABLE 14

| UEPagingCoverageInformation-NB message |
| --- |
| UEPagingCoverageInformation-NB Message |
| -- ASN1START<br>UEPagingCoverageInformation-NB ::= SEQUENCE {<br>    criticalExtensions               CHOICE {<br>        c1                           CHOICE{<br>            uePagingCoverageInformation-r13<br>        UEPagingCoverageInformation-NB-IEs,<br>            spare3 NULL, spare2 NULL, spare 1 NULL<br>        },<br>        criticalExtensionsFuture       SEQUENCE { }<br>    }<br>}<br>UEPagingCoverageInformation-NB-IEs ::= SEQUENCE {<br>-- the possible value(s) can differ from those sent on Uu<br>    npdcch-NumRepetitionPaging-r13   INTEGER (1..2048)    OPTIONAL,<br>    nonCriticalExtension                   WUSCoverageInformation-NB-r15-IEs<br>    OPTIONAL<br>    }<br>WUSCoverageInformation-NB-r15-IEs ::= SEQUENCE {<br>    wus-NumRepetition-NB-r15       INTEGER (1..1024)    OPTIONAL,<br>    nonCriticalExtension                   SEQUENCE { }      OPTIONAL<br>    defaultPOsWUS-NB-r15               INTEGER(1..MaxPOsWUS) OPTIONAL<br>}<br>-- ASN1STOP |

Table 16 is an example of fields and/or information that may be included in the UEPagingCoverageInformation message.

TABLE 14

| UEPagingCoverageInformation-NB Message |
| --- |
| UEPagingCoverageInformation-NB Message |
| -- ASN1START<br>UEPagingCoverageInformation ::= SEQUENCE {<br>    criticalExtensions               CHOICE {<br>        c1                                  CHOICE{<br>            uePagingCoverageInformation-r13     UEPagingCoverageInformation-<br>r13-IEs,<br>            spare7 NULL,<br>            spare6 NULL, spare5 NULL, spare4 NULL,<br>            spare3 NULL, spare2 NULL, spare1 NULL<br>        },<br>        criticalExtensionsFuture       SEQUENCE {}<br>    }<br>}<br>UEPagingCoverageInformation-r13-IEs ::= SEQUENCE {<br>    mpdcch-NumRepetition-r13         INTEGER (1..256)   OPTIONAL,<br>    nonCriticalExtension                   WUSCoverageInformation-r15-IEs<br>    OPTIONAL<br>}<br>WUSCoverageInformation-r15-IEs ::=SEQUENCE{<br>    wus-NumRepetition-r15            INTEGER (1..256)   OPTIONAL,<br>    nonCriticalExtension                   SEQUENCE { }      OPTIONAL<br>    defaultPOsWUS-NB-r15               INTEGER(1..MaxPOsWUS)<br>OPTIONAL<br>}<br>-- ASN1STOP |

In some embodiments, the defaultPOsWUS parameter that may be decided by RAN node 111 and MME 121 may be either cell-specific or Tracking Area-specific (TA-specific). When the defaultPOsWUS parameter is cell-specific, then it may enable RAN node 111 to tailor the WUS overhead to its own load, whereas when the defaultPOsWUS parameter is TA-specific, then UE 101 may assume similar information in all cells within a TA and may therefore have less signaling overhead in the core network when UE 101 moves from one cell to another.

Additional techniques, described herein, may be used to split a value of idle mode DRX parameter nB into two parameters (nB1 and nB2) such that gaps between paging frames can be more than one radio frame and multiple POs may be scheduled with a single radio frame. The techniques described herein may be used to determine occasions where the UEs supporting WUSs are notified by the WUS about paging or other types of DL data and may also be used to enable UEs to determine which WUS may map to which POs, In LTE, the paging frame (PF) may be calculated using the following formula: SFN mod T=(T div N)*(UE_ID mod N). Where SFN is system frame number, UE_ID=IMSI mod 1024, N=min(T, nB), nB is an idle mode DRX parameter, and T is value of DRX cycle in number of radio frames. After determining the PF, a PO may be calculated by finding an index (i_s) pointing to the PO as follows: i_s=floor (UE_ID/N) mod Ns. Where Ns=max (1, nB/T), and the index (i_s) is mapped to a subframe pattern for PO, which is either subframe 0, 4, 5, or 9.

If UE 101 supports a non-anchor carrier for paging, paging narrowband (PNB) where UE 101 monitors for the paging can be calculated using a formula. For UEs monitoring MPDCCH, the PNB may be: PNB=floor(UE_ID/ (N*Ns)) mod Nn. Where Nn is the number of paging narrowbands provided in system information. Similarly, for UEs 101 monitoring the NPDCCH, the paging carrier may be determined by a smallest paging carrier (n) fulfilling the following equation:

$$\text{floor}(UE\_ID/(N*Ns)) \bmod \Sigma_{j=0}^{j=(maxPagingCarriers-1)} \text{Weight}[j] < \Sigma_{k=0}^{k=(n-1)} \text{Weight}[k]$$

Where, maxPagingCarriers is the number of configured paging carriers provided in the system information and Weight(i) is the weight for the paging carrier i.

In LTE systems, extended DRX (eDRX) may be configured by the core network with parameter eDRX cycle ($T_{eDRX,H}$) in hyper-frames and paging time window (PTW) length in seconds. The paging hyper-frame satisfies the following formula: H-SFN mod $T_{eDRX,H}$=UE_ID_H mod $T_{eDRX,H}$. Where UE_ID_H: IMSI mod 1024; $T_{eDRX,H}$: 1, 2, . . . , 256 Hyper-frames, and the PTW start offset may satisfy the following equation: SFN=256*ieDRX, where ieDRX=floor(UE_ID_H/$T_{eDRX,H}$) mod 4.

Currently in idle mode DRX, a single parameter, nB, is used to determine either how many PFs (parameter N:min (T,nB) to schedule within a DRX cycle or how far two POs (parameter Ns:max(1,nB/T)) are scheduled. Also, the value of nB is not UE specific. Rather, the value of nB broadcast in SIBs is applicable to all UEs. This is one reason that POs for UEs can be either scheduled at multiple subframes within a frame or scheduled with some frame apart but not both at the same time. Furthermore, minimum value of the parameter nB is T/1024, which indicates that the maximum gap between POs is 1024 radio frames.

The use of WUSs may be a solution to power consumption reduction when using the DL physical channel In this case, UE 101 may monitor a different signal with a smaller size than the legacy paging notification signal, and may monitor the legacy paging (e.g., LTE paging) only when UE 101 is notified in the WUS to do so. Some implementations using the WUS may include: for idle mode, in specifying a power saving physical signal to indicate whether UE 101 is to decode subsequent physical channel(s) for idle mode paging, select a candidate among the following power saving physical signals: WUS or discontinuous transmission (DTX) or WUS with no DTX.

Embodiments, described herein, may include techniques for splitting the value of parameter (nB) into two parameters (nB1 and nB2) such that the gap between paging frames can be more than one radio frame and multiple POs can be scheduled within a single radio frame. In some embodiments, the gap between paging frames can be more than 1024 radio frames. Embodiments, described herein, may also include techniques to determine occasions where the UEs 101 supporting WUSs are notified by the WUS about paging or any downlink data. Aspects of such embodiments may split the value of idle mode DRX parameter nB into two parameters, nB1 and nB2. The parameter nB is used to determine the number of POs/PFs within T whereas nB1 is used to determine a number of POs within a frame and nB2 is used to determine a number of PFs within T.

This solution may provide paging load reductions from a PO when paging frames are scheduled with a gap of more than one radio frame using idle mode DRX parameter nB, which are not available in current LTE systems. Although the present disclosure is described with regard to LTE systems, the embodiments are not limited thereto; the embodiments herein may be applicable to UEs 101 supporting WUS and/or legacy paging mechanism in IDLE mode or any RRC inactive state in the LTE and beyond, and may be applicable to 5G/NR technologies. The present disclosure also considered Frequency Division Duplexing (FDD) configurations, but embodiments herein may also be applicable to Time Division Duplexing (TDD) configurations.

Figure 3:
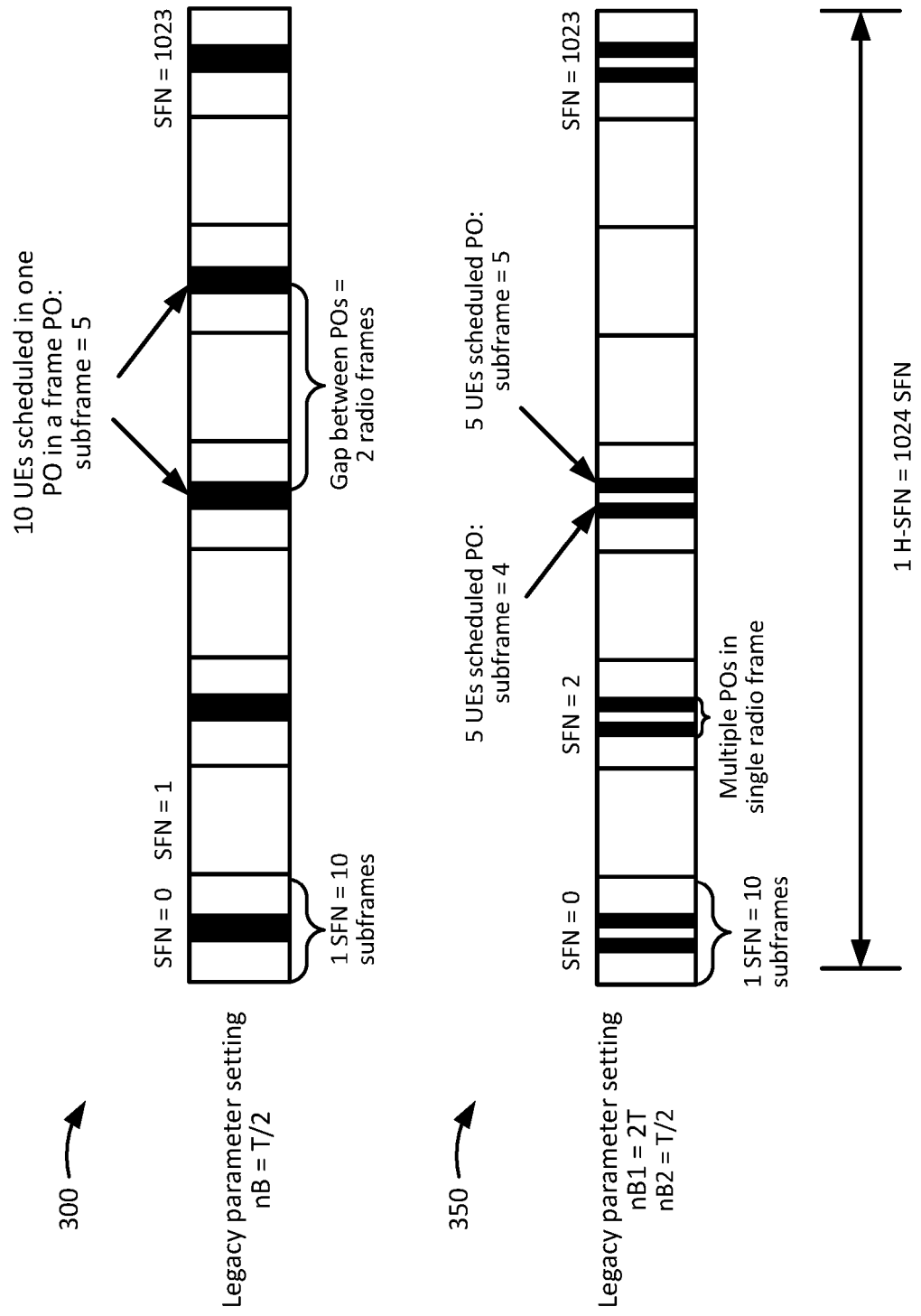
FIG. 3 is a block diagram of an example of splitting parameter nB into nB1 and nB2 according to various embodiments described herein.

FIG. 3 is a block diagram of an example 300 of splitting parameter nB into nB1 and nB2 according to various embodiments described herein. The upper part 200 of the FIG. 2 shows a gap between POs that may be two radio frames when the parameter nB is set to T/2. Since the value of parameter nB may be used to allocate the gap between POs, it is not possible in current LTE that the multiple POs could be scheduled within a radio frame so that the total paging load in a PO is reduced. One issue with the LTE legacy configuration (i.e., single nB parameter for all UEs 101) is that when the gap between two POs is larger (in one example, the gap is 16 radio frames for nB=T/16 and the gap is 32 radio frames for nB=T/32) paging load in a paging occasion (PO) is higher since no POs can be scheduled between the gap between the POs and many UEs 101 have to be scheduled at the same PO.

As shown in the lower part 250 of FIG. 2, the techniques described herein may reduce the paging load in a single PO within a frame by spreading the POs over a single radio frame, which may include splitting the values of parameter nB into two values (nB1 and nB2) while maintaining the same or a different gap between the paging frames. For RAN node to schedule UEs 101 in such a way that there are multiple POs within one frame, while maintaining a gap between the paging frames, two values of parameter nB may be defined or a set nB-new whose value may be defined as: nB-new={nB1, nB2}, where nB1=4T, 2T, T, and nB2=T, T/2, T/4, T/8, and so on. The parameters N and Ns may be defined as: N:min(T,nB2); and Ns=max(1,nB1/T). The paging frame may be defined as: SFN mod T=(T div N)*floor (UE_ID mod N).

In some embodiments, the configuration of a gap between two POs may be larger than 1024 radio frames. In current LTE systems, a minimum value of parameter nB may be T/1024, in the case of NB-IoT UEs 101, meaning that the POs are separated by 1024 frames at most. However, BL UEs 101, UEs in CE 101, and/or NB-IoT UEs 101 may use repetitions of the paging message spread over more than 1024 radio frames (or more than one hyper-frame) and/or may use more than 10240 repetitions of a paging message at some point. In this case, even using the smallest possible value of parameter nB, there is a possibility that the transmissions of paging messages may overlap, which in turn, could lead to false paging.

In some embodiments (when eDRX is not configured) if the repetition of the transmission may last longer than 1 hyper-frame (e.g., 2048 frames) a new value of parameter nB2 may be defined such that the any two paging frames may be apart by more than 1024 frames. In such scenarios, nB2 may be defined as T/M, where T may be a legacy (e.g., LTE) value of a DRX cycle, and M may be 1, 2, 4, 8, 16, 32, 64, 128, 256, 512, 1024, 2048, 4096, and so on. The value of nB2 may be smaller than one; and the value of nB1 may be set to T or multiples of T. For instance, when UE 101 or RAN node 111 detects that the value of M is greater than 1024, the following configuration may be applied: N=max (min(T, nB2), T/1024); and the next paging frame and paging occasion may be calculated at the hyper-frame (PH) which may be defined as: PH=(floor(M/1024)*k) mod 1024, where k=0, 1, 2, 3 . . . , 1023 when eDRX has not been configured. In some embodiments, when M=2048, paging hyper frames (PH) may be 0, 2, 4, 6, . . . , and 1022. When parameter nB or nB2 is also set to 1024, the gap between paging frames for any UEs 101 may become M frames (e.g., 2048 frames).

In some embodiments (when eDRX is configured) a legacy (e.g., LTE) eDRX PH, where the current PTW is given as: PH=H-SFN mod $T_{eDRX,H}$=UE_ID_H mod $T_{eDRX,H}$. To maintain a gap between two paging hyper frames, a new parameter ($nB_{eDRX}$) may be defined to calculate the PTW start offset and PH, as follows: PTW start offset=0, when nB or nB2<T/512; PTW start offset=512*floor(UE_ID_H/$T_{eDRX,H}$) mod 2, when nB or nB2=T/512; PTW start offset=256*floor(UE_ID_H/$T_{eDRX,H}$) mod 4; otherwise PH=H-SFN mod $T_{eDRX,H}$=($T_{eDRX,H}$ div $N_{eDRX}$)*(UE_ID_H mod $N_{eDRX}$), where $N_{eDRX}$=min($T_{eDRX,H}$, $nB_{eDRX}$) and $nB_{eDRX}$=$T_{eDRX,H}$, $T_{eDRX,H}$/2, $T_{eDRX,H}$/4 and so on. In some embodiments, $nB_{eDRX}$=$T_{eDRX,H}$/2 may indicate that the gap between two paging frames is two hyper frames. When parameter nB or nB2 are also set to T/1024, then the gap between two paging frames for any UEs 101 may become two hyper frames (2048 frames).

Additionally, or alternatively, POs may be configured over all subframes. For instance, PO may be scheduled in any subframe within a single radio frame. In such a scenario, the PO may be calculated by finding an index (i_s) pointing to the PO. The index (i_s) may be mapped to a subframe pattern for PO, which may either be subframe 0, 4, 5, or 9 in the current LTE specification. The value of nB1 may be defined as nB1=T, 2T, 3T, 4T, 5T, 6T, 7T, . . . , (S−1)*T, where S is the number of subframes in a radio frame. In one example, S=10 for LTE. This may indicate that the value of parameter Ns and PO index (i_s) range from 0 to (S−1).

The techniques described herein may include a new mapping table of the PO index (i_s) to a subframe pattern, which may be used by UE 101 and/or RAN node 111 to determine one or more POs and/or subframe patterns. Table 15 may include an example of such a mapping table.

TABLE 15

Mapping Table of PO index (i_s) to Subframe Pattern

| Ns | PO when i_s = 0 | PO when i_s = 1 | PO when i_s = 2 | PO when i_s = 3 | PO when i_s = 4 | PO when i_s = 5 | PO when i_s = 6 | PO when i_s = 7 | PO when i_s = 8 | PO when i_s = 9 |
|---|---|---|---|---|---|---|---|---|---|---|
| 1 | 9 | N/A | N/A | N/A | N/A | N/A | N/A | N/A | N/A | N/A |
| 2 | 4 | 9 | N/A | N/A | N/A | N/A | N/A | N/A | N/A | N/A |
| 3 | 0 | 4 | 9 | N/A | N/A | N/A | N/A | N/A | N/A | N/A |
| 4 | 0 | 4 | 5 | 9 | N/A | N/A | N/A | N/A | N/A | N/A |
| 5 | 0 | 1 | 4 | 5 | 9 | N/A | N/A | N/A | N/A | N/A |
| 6 | 0 | 1 | 2 | 4 | 5 | 9 | N/A | N/A | N/A | N/A |
| 7 | 0 | 1 | 2 | 3 | 4 | 5 | 9 | N/A | N/A | N/A |
| 8 | 0 | 1 | 2 | 3 | 4 | 5 | 6 | 9 | N/A | N/A |
| 9 | 0 | 1 | 2 | 3 | 4 | 5 | 6 | 7 | 9 | N/A |
| 10 | 0 | 1 | 2 | 3 | 4 | 5 | 6 | 7 | 8 | 9 |

In some embodiments, 5G/NR systems may implement a new nB parameter (nB-new). Similar to legacy value (e.g., current LTE standards) of parameter nB, nB-new may be defined in a SIB2 message and broadcast by RAN node 111. In some embodiments, nB-new may be provided in one or more IEs, such as the RadioResourceConfigCommonSIB IE of the SIB2, an example of which is provided in Table 16.

TABLE 16

RadioResourceConfigCommonSIB IE with nB-new
RadioResourceConfigCommonSIB IE

```
-- ASN1START
RadioResourceConfigCommonSIB  ::=    SEQUENCE{
    rach-ConfigCommon                RACH-ConfigCommon,
    bcch-Config                      BCCH-Config,
```

TABLE 16-continued

RadioResourceConfigCommonSIB IE with nB-new
RadioResourceConfigCommonSIB IE

```
        pcch-Config                        PCCH-Config,
        prach-Config                       PRACH-ConfigSIB,
        pdsch-ConfigCommon                 PDSCH-ConfigCommon,
        pusch-ConfigCommon                 PUSCH-ConfigCommon,
        pucch-ConfigCommon                 PUCCH-ConfigCommon,
        soundingRS-UL-ConfigCommon         SoundingRS-UL-ConfigCommon,
        uplinkPowerControlCommon           UplinkPowerControlCommon,
        ul-CyclicPrefixLength              UL-CyclicPrefixLength,
        ...,
        [[  uplinkPowerControlCommon-v1020  UplinkPowerControlCommon-v1020   OPTIONAL
            -- Need OR
        ]],
        [[  rach-ConfigCommon-v1250        RACH-ConfigCommon-v1250          OPTIONAL
            -- Need OR
        ]],
        [[  pusch-ConfigCommon-v1270       PUSCH-ConfigCommon-v1270         OPTIONAL
            -- Need OR
        ]],
        [[  bcch-Config-v1310              BCCH-Config-v1310                OPTIONAL,
            -- Need OR
pcch-Config-v1310                          PCCH-Config-v1310                OPTIONAL,
        -- Need OR
freqHoppingParameters-r13                  FreqHoppingParameters-r13        OPTIONAL,
        -- Need OR
pdsch-ConfigCommon-v1310                   PDSCH-ConfigCommon-v1310         OPTIONAL,
        -- Need OR
pusch-ConfigCommon-v1310                   PUSCH-ConfigCommon-v1310         OPTIONAL,
        -- Need OR
prach-ConfigCommon-v1310                   PRACH-ConfigSIB-v1310            OPTIONAL,
        -- Need OR
pucch-ConfigCommon-v1310                   PUCCH-ConfigCommon-v1310         OPTIONAL
        -- Need OR
]],
[[      pcch-config-nb-rxy                 PCCH-Config-nb-rxy               OPTIONAL
        -- Need OR
            ]]
        }
**** omitted ****
        defaultPagingCycle                 ENUMERATED {
                                             rf32, rf64, rf128, rf256},
            nB                             ENUMERATED {
                                             fourT, twoT, oneT, halfT, quarterT,
oneEighthT, oneSixteenthT, oneThirtySecondT}
        }
        PCCH-Config-nb-rxy::=              SEQUENCE{
            nB1                            ENUMERATED {
                                             fourT, twoT, oneT}
            nB2                            ENUMERATED {
                                             oneT, halfT, quarterT, oneEighthT,
                                             oneSixteenthT, oneThirtySecondT,
oneSixtyFourthT, oneOneHundredTwentyEighthT,oneTwoHundredFiftySixthT,
oneFiveHundredTwelthT, oneOneThousandTwentyFourthT,oneTwoThousandFortyEighthT,
oneFourThousandNinty SixthT}
        }
        PCCH-Config-v1310 ::=              SEQUENCE{
            paging-narrowBands-r13         INTEGER (1..maxAvailNarrowBands-r13),
            mpdcch-NumRepetition-Paging-r13 ENUMERATED {r1, r2, r4, r8, r16, r32, r64,
r128,r256},
            nB-v1310                       ENUMERATED {one64thT, one128thT,
one256thT}
                                                       OPTIONAL          -- Need
OR
        }
        UL-CyclicPrefixLength ::=          ENUMERATED {len1, len2}
-- ASN1STOP
```

Table 17 is an example of fields and/or information that may be included in the RadioResourceConfigCommonSIB IE.

TABLE 17

RadioResourceConfigCommon Field Descriptions
RadioResourceConfigCommon Field Descriptions additionalSpectrumEmissionSCell
The UE requirements related to additionalSpectrumEmissionSCell are defined in TS 36.101 [42]. E-UTRAN configures the same value in additionalSpectrumEmissionSCell for all SCell(s) of the same band with UL configured. The additionalSpectrumEmissionSCell is applicable for all serving cells (including PCell) of the same band with UL configured.
ul-CyclicPrefixLength
Parameter: Uplink cyclic prefix length see TS 36.211 [21, 5.2.1] where len1 corresponds to normal cyclic prefix and len2 corresponds to extended cyclic prefix.
* ommited*
nB1
Parameter: If nB-New-PCCH-Config is signalled in SystemInformationBlockType2, nB1 is used to calculate parameter Ns to derive the Paging Occasion according to TS 36.304 [4]. Value in multiples of 'T' as defined in TS 36.304 [4].
A value of half T corresponds to (½) * T, a value of quarterT corresponds to (¼) * T, a value of oneEighthT corresponds to (⅛) * T and so on.
nB2
Parameter: If nB-New-PCCH-Config is signalled in SystemInformationBlockType2, nB1 is used to calculate parameter N to derive the Paging Frame and Paging Occasion according to TS 36.304 [4]. Value in multiples of 'T' as defined in TS 36.304 [4]. A value of fourT corresponds to 4 * T, a value of twoT corresponds to 2 * T and so on.

In some embodiments, the configuration, determination, scheduling, etc., of WUS occasions may be configured using a legacy (e.g., LTE) PO calculation. For example, the legacy PO calculation may be determined based on one or more legacy PF/PO formulas for UE 101. UE 101 may then derive the WUS occasion based on the legacy PO. In some embodiments, UE 101 does not monitor the PDCCH (e.g., MPDCCH or NPDCCH) in the legacy PO, instead UE 101 monitors the WUS notification. In the legacy PO, a paging notification in the PDCCH (e.g., MPDCCH or NPDCCH) may never be sent. When a WUS indicates of paging or DL data, UE 101 may start monitoring the PDCCH (e.g., MPDCCH or NPDCCH) until the next radio frame. However, POs in NPDCCH may only be scheduled in valid subframes (e.g., subframes that are not used for the legacy POs). In some examples, the WUS may always be transmitted in legacy PO subframes (e.g., subframes 0, 4, 5 and 9) and the corresponding paging may be scheduled by NPDCCH in one or more of subframes 1, 2, 3, 6, 7, or 8 of the current radio frame or the next radio frame. Once the wake-up signal notification is received, UE 101 may wake up to read the (N/M) PDCCH and corresponding (N)PDSCH to read the paging message. If there is no UE_ID for that UE 101 within the paging message, then UE 101 may resume monitoring the WUS notifications as before.

In some embodiments, a subframe may be mapped to the legacy (e.g., LTE) PO subframe for UE 101, and the mapped subframe may be used by UE 101 for monitoring for WUS notifications. UE 101 may receive such a mapping from RAN node 111, in addition to using the mapping to listen for WUS notifications. Table 18 is an example of a mapping of the legacy POs to WUS occasion (WUO).

TABLE 18

| RadioResourceConfigCommonSIB IE with nB-new | |
|---|---|
| Legacy PO | WUS Occasion |
| 0 | 2 |
| 4 | 2 |
| 5 | 8 |
| 9 | 8 |

In some embodiments, UE 101 may use one or more subframe numbers to determine WUS occasions. For WUS, a WUS occasion (WUO) resource may not be overlapped with legacy PO subframes (e.g., subframes 0, 4, 5 and 9). Therefore, a non-overlapping subframes may be defined for WUS. In some examples, the non-overlapping subframes may be 1, 2, 3, 6, 7 and 8 for FDD bands as shown in Table 19 below. Note that the WUS frame may be calculated in a similar way of calculating a legacy paging frame.

TABLE 19

| | Manning of Subframes to WUS Occasions | | | | | | | | | |
|---|---|---|---|---|---|---|---|---|---|---|
| Ns | WUO when i_s = 0 | WUO when i_s = 1 | WUO when i_s = 2 | WUO when i_s = 3 | WUO when i_s = 4 | WUO when i_s = 5 | WUO when i_s = 6 | WUO when i_s = 7 | WUO when i_s = 8 | WUO when i_s = 9 |
| 1 | 8 | N/A | N/A | N/A | N/A | N/A | N/A | N/A | N/A | N/A |
| 2 | 3 | 8 | N/A | N/A | N/A | N/A | N/A | N/A | N/A | N/A |
| 3 | 1 | 3 | 8 | N/A | N/A | N/A | N/A | N/A | N/A | N/A |
| 4 | 1 | 3 | 6 | 8 | N/A | N/A | N/A | N/A | N/A | N/A |
| 5 | 1 | 2 | 3 | 6 | 8 | N/A | N/A | N/A | N/A | N/A |
| 6 | 1 | 2 | 3 | 6 | 7 | 8 | N/A | N/A | N/A | N/A |
| 7 | 1 | 2 | 3 | 6 | 7 | 8 | 1 | N/A | N/A | N/A |
| 8 | 1 | 2 | 3 | 6 | 7 | 8 | 1 | 2 | N/A | N/A |
| 9 | 1 | 2 | 3 | 6 | 7 | 8 | 1 | 2 | 3 | N/A |
| 10 | 1 | 2 | 3 | 6 | 7 | 8 | 1 | 2 | 3 | 6 |

A table mapping subframes to WUS occasions (e.g., Table 19) and WUS configuration parameters may be configured in such a way that WUS occasions are not overlapped with legacy POs and/or some subframes reserved for other purposes. In some embodiments, subframes 0, 4, 5 and 9 may be used for legacy POs, and subframe 1 and 8 may be reserved for other purposes, such that subframes 0, 1, 4, 5, 8, and 9 may not be used for WUS occasions. In this case, the following may be correct configuration for WUS: nB1=4T, 2T, T; and nB2=T, T/2, T/4, T/8, and so on.

TABLE 20

Mapping of Subframes to WUS Occasions

| Ns | WUO when i_s = 0 | WUO when i_s = 1 | WUO when i_s = 2 | WUO when i_s = 3 |
|---|---|---|---|---|
| 1 | 7 | N/A | N/A | N/A |
| 2 | 3 | 7 | N/A | N/A |
| 4 | 2 | 3 | 6 | 7 |

The subframe numbers indicated in Table 20 are for illustration purposes and the techniques described herein may include fewer, additional, alternative, and/or other combinations of subframe numbers.

In some embodiments, the legacy (e.g., LTE) parameter nB may not be set to 4T (or 2T) for UEs 101 monitoring PDCCH, MPDCCH and/or NPDCCH for paging notification. This may be because some subframes are not used for legacy paging notifications. In scenarios involving FDD, only subframes 4 and 9 may be used for legacy paging using the parameter nB set to 2T and/or a new parameter nB1 set to 2T; and subframes 0 and 6 may be used for WUS notifications using the parameter nB or nB1 set to 2T. In such a scenario, the WUS frame and legacy paging frame may be calculated in the same way. The subframe in the radio frame for a paging occasion or WUS occasion may be calculated, determined, etc., using a pre-defined table, such as Table 21 provided below.

TABLE 21

Mapping of POs to Subframe(s)

| Ns | PO when i_s = 0 | PO when i_s = 1 | WUO when i_s = 0 | WUO when i_s = 1 |
|---|---|---|---|---|
| 1 | 9 | N/A | 0 | N/A |
| 2 | 4 | 9 | 0 | 6 |

In some embodiments, a paging narrowband may be reserved for the purpose of sending paging or DL data notifications to UEs 101 using a separate WUS. In this narrowband, UE 101 may not monitor the PDCCH, MPDCCH, or NPDCCH in the legacy (e.g., LTE PO). In one example, if n is the total number of paging carriers configured to a UE 101, then the $n^{th}$ carrier may be used for the WUS notification while the other carriers (1 to $(n-1)^{th}$ paging carriers) may be used for legacy paging monitoring.

Figure 4:
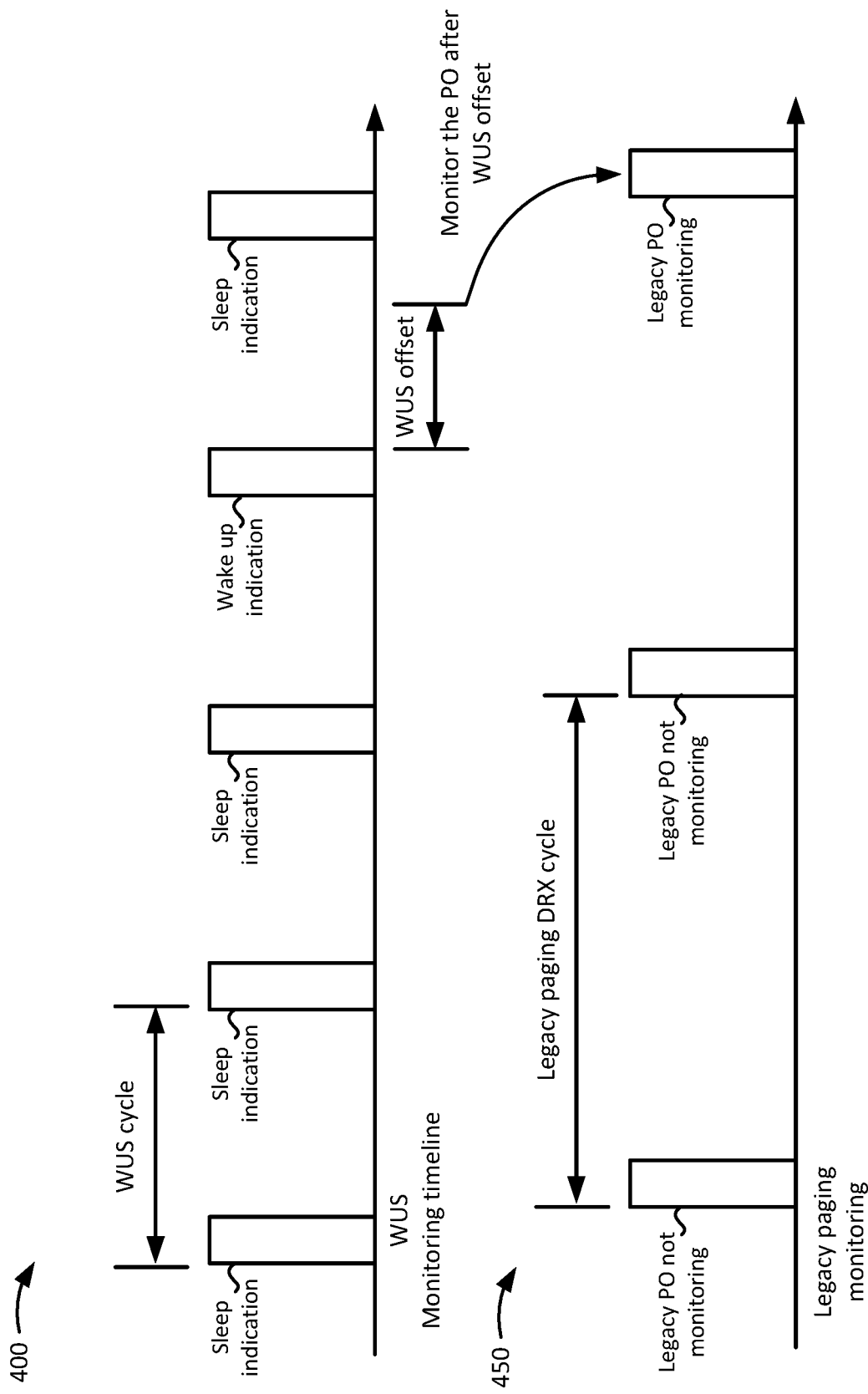
FIG. 4 is a block diagram of an example of using a WUS offset to determine when UE is to monitor paging occasions (POs)

FIG. 4 is a block diagram of an example of using a WUS offset to determine when UE 101 is to monitor POs. As shown, in a top portion 400 of FIG. 4, a WUS monitoring timeline may include multiple WUS cycles that each may be defined by an event, signal, indication, etc. For example, the WUS monitoring timeline of FIG. 4 includes several sleep indication, which may correspond to an indication for UE 101 to remain in an IDLE mode (e.g., UE 101 may periodically monitor for a WUS, determine that no WUS has been received, and remain in IDLE mode).

At some point, UE 101 may receive a WUS (e.g., a wake up indication) prompting UE 101 to prepare for PO monitoring. As shown, UE 101 may be configured to apply a WUS offset to determine when UE 101 should begin PO monitoring. In some embodiments, the WUS offset may be provided to UE 101 as part of system information (e.g., in a SIB) from RAN node 111. Additionally, the WUS offset may include a period of time. As shown, UE 101 may determine when to begin PO monitoring by applying the WUS offset from the reception of the wake up indication (e.g., detecting the WUS).

During the WUS offset period, UE 101 may take time to switch a main baseband receiver. Alternatively, there could be some UEs 101 monitoring the PO in enhanced coverage, which may use a longer time and repetitions to properly decode the WUS, and yet some other UEs 101 that receive and decode the WUS earlier. In either case, the next PO monitored after receiving the WUS for UEs 101 in EC mode, for both NB-IoT UEs 101 and efeMTC UEs 101, cannot be the one immediately following the WUS notification as RAN node 111 has no way of knowing when UE 101 may have properly decoded the WUS, especially if the UE is in IDLE mode.

Figure 5:
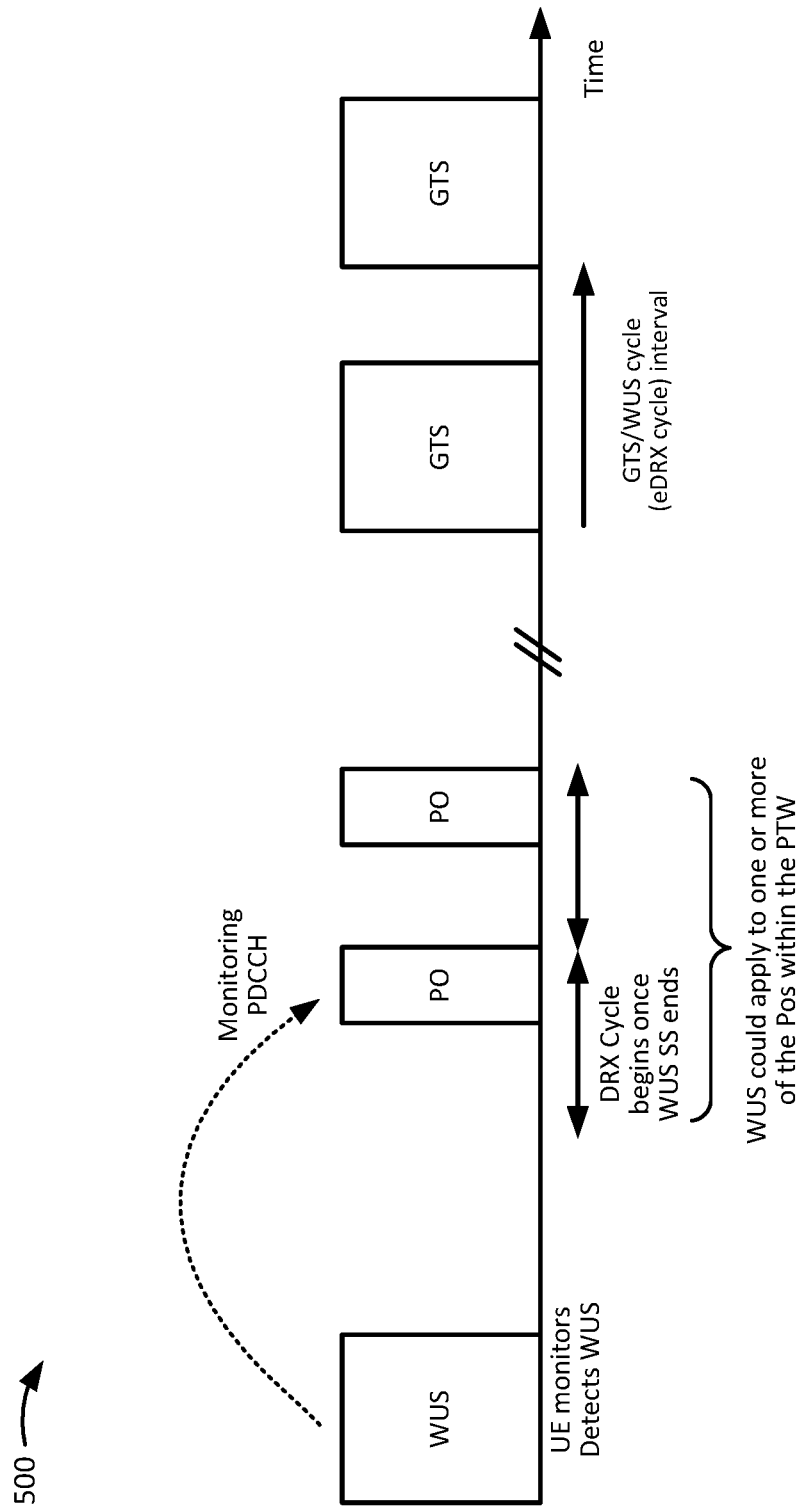
FIG. 5 is a block diagram of an example for mapping a WUS to one or more POs.

FIG. 5 is a block diagram of an example 500 for mapping a WUS to one or more POs. As shown, POs used for sending paging messages may follow within a PTW that may be especially defined for receiving paging messages for those notified using WUS. The number of DRX cycles in this PTW following the WUS may be defined by RAN node 111 either using RRC signaling or through cell-specific parameters which will include the following: a Length of Wake-up Paging Time Window (wPTW) for POs indicated by WUS (may be anywhere from 1-n DRX cycles); and wake-up DRX cycles (which may be 80 ms, 160 ms, 320 ms, 640 ms, 1280 ms). Additionally, new cycle lengths may need to be re-introduced for NB-IoT UEs 101 to reduce latency. As shown, the WUS may apply to multiple POs of multiple DRX cycles.

This configuration may also enable UE 101 to include a separate wake-up receiver, if possible, which may allow UE 101 to have even deeper power saving states (even for WUS cycles as short as 2.56 s) thus providing a low-latency solution at high power savings.

In some embodiments, RAN node 111 may provide UE 101 with configuration information for detecting WUSs, mapping a WUSs to POs, etc. In some embodiments, such information may be provided by RAN node 111 as system information, which may include one or more IEs, such as the RadioResourceConfigCommonSIB IE and RadioResourceConfigCommon IE. Such IEs may be used to specify common radio resource configurations in the system information and in the mobility control information, respectively (e.g., random access parameters and static physical layer parameters). Table 22 is an example of a RadioResourceConfigCommon IE that includes WUS configuration information.

TABLE 22

RadioResourceConfigCommon IE with WUS Configuration Information
RadioResourceConfigCommon IE

```
-- ASN1START
RadioResourceConfigCommonSIB ::=    SEQUENCE{
    rach-ConfigCommon               RACH-ConfigCommon,
    bcch-Config                     BCCH-Config,
    pcch-Config                     PCCH-Config,
```

TABLE 22-continued

RadioResourceConfigCommon IE with WUS Configuration Information
RadioResourceConfigCommon IE

```
    prach-Config                    PRACH-ConfigSIB,
    pdsch-ConfigCommon              PDSCH-ConfigCommon,
    pusch-ConfigCommon              PUSCH-ConfigCommon,
    pucch-ConfigCommon              PUCCH-ConfigCommon,
    soundingRS-UL-ConfigCommon      SoundingRS-UL-ConfigCommon,
    uplinkPowerControlCommon        UplinkPowerControlCommon,
    ul-CyclicPrefixLength           UL-CyclicPrefixLength,
    ...,
    [[  uplinkPowerControlCommon-v1020   UplinkPowerControlCommon-v1020
    OPTIONAL    -- Need OR
    ]],
    [[  rach-ConfigCommon-v1250     RACH-ConfigCommon-v1250      OPTIONAL
    -- Need OR
    ]],
    [[  pusch-ConfigCommon-v1270    PUSCH-ConfigCommon-v1270     OPTIONAL
    -- Need OR
    ]],
    [[  bcch-Config-v1310           BCCH-Config-v1310            OPTIONAL,
    -- Need OR
        pcch-Config-v1310           PCCH-Config-v1310            OPTIONAL,
    -- Need OR
        freqHoppingParameters-r13   FreqHoppingParameters-r13    OPTIONAL,
    -- Need OR
        pdsch-ConfigCommon-v1310    PDSCH-ConfigCommon-v1310     OPTIONAL,
    -- Need OR
        pusch-ConfigCommon-v1310    PUSCH-ConfigCommon-v1310     OPTIONAL,
    -- Need OR
        prach-ConfigCommon-v1310    PRACH-ConfigSIB-v1310        OPTIONAL,
    -- Need OR
        pucch-ConfigCommon-v1310    PUCCH-ConfigCommon-v1310     OPTIONAL
    -- Need OR
    ]],
    [[  highSpeedConfig-r14         HighSpeedConfig-r14          OPTIONAL,
    -- Need OR
        prach-Config-v1430          PRACH-Config-v1430           OPTIONAL,
    -- Need OR
        pucch-ConfigCommon-v1430    PUCCH-ConfigCommon-v1430     OPTIONAL
    -- Need OR
    ]],
    [[  ce-RSS-Config-r15           RSS-Config-r15               OPTIONAL,
        -- Need OR
        wus-Config-r15              WUS-Config-r15               OPTIONAL
        -- Need OR
    ]]
}
```

The WUS-Config IE, of the RadioResourceConfigCommonSIB IE of Table 22, may be used to specify the WUS configuration for UE 101. For the UEs 101 supporting WUS, E-UTRAN may use WUSs to indicate that UE 101 shall attempt to receive paging in that cell. Table 23 is an example of a WUS-Config IE.

TABLE 23

WUS-Config IE
WUS-Config

```
-- ASN1START
WUS-Config-r15 ::=          SEQUENCE {
    maxDuration-r15         ENUMERATED {one32th, one16th, one8th, one4th},
    numPOs-r15              ENUMERATED {n1, n2, n4, spare1}
    DEFAULT n1,
    freqLocation-r15        ENUMERATED {n0, n2, n4, spare1},
    timeOffsetDRX-r15       ENUMERATED {ms40, ms80, ms160, ms240},
    timeOffset-eDRX-Short-r15   ENUMERATED {ms40, ms80, ms160, ms240},
    timeOffset-eDRX-Long-r15    ENUMERATED {s1, s2}       OPTIONAL --
Need OP
}
-- ASN1STOP
```

Table 24 is an example of fields and/or information that may be included in the WUS-Config IE.

TABLE 24

WUS-Config Field Descriptions
WUS-Config Field Descriptions freqLocation
Frequency location of WUS within paging narrowband for BL UEs and UEs in CE. Value n0 corresponds to WUS in the 1st and 2nd PRB, value n2 represents the 3rd and 4th PRB, and value n4 represents the 5th and 6th PRB.
maxDuration
Maximum duration of WUS, expressed as a ratio of Rmax associated with Type 1-CSS, see TS 36.211 [21]. Value one32th corresponds to Rmax * 1/32, value one16th corresponds to Rmax * 1/16 and so on.
numPOs
Number of consecutive Paging Occasions (PO) mapped to one WUS, applicable to UEs configured to use extended DRX, see TS 36.304 [4]. Value n1 corresponds to 1 PO, value n2 corresponds to 2 POs and so on. If the field is not present, the UE applies the (default) value of n1.
timeOffsetDRX
Minimum time gap in milliseconds from the end of the configured maximum duration of WUS to the first associated PO, see TS 36.211 [21]. Value ms40 corresponds to 40 ms, value ms80 corresponds to 80 ms and so on.
timeOffset-eDRX-Short
When eDRX is used, the short non-zero gap in milliseconds from the end of the configured maximum WUS duration to the associated PO, see TS 36.211 [21]. Value ms40 corresponds to 40 ms, value ms80 corresponds to 80 ms and so on. E-UTRAN configures timeOffset-eDRX-Short to a value longer than or equal to timeOffsetDRX.
timeOffset-eDRX-Long
When eDRX is used, the long non-zero gap in seconds from the end of the configured maximum WUS duration to the associated PO, see TS 36.211 [21]. Value s1 corresponds to 1 s and value s2 corresponds to 2 s. If the field is absent, UE uses timeOffset-eDRX-Short for monitoring WUS.

In some embodiments, UEs 101 may be organized or ranged into logical groups to, for example, better manage the number of UEs 101 monitoring a particle PO. The power savings achieved by UEs 101 may increase as UEs 101 wakes up less often to monitor paging messages intended for other UEs 101. Thus, reducing the number of UEs 101 monitoring a PO unnecessarily may increase power savings for UEs 101. This may be achieved by, for example, organizing UEs 101 into groups (or sub-groups) that are associated with certain POs (e.g., POs configured to carry paging messages for a corresponding group of UEs 101).

For example, a WUS may be configured to indicate a UE-specific ID (e.g., IMSI or S-TMSI of UE 101). As such, RAN node 111 may determine a number of UEs 101 (e.g., a group of UEs 101) for monitoring one or more POs and transmit one or more WUSs that includes a UE-specific ID for each UE 101. UEs 101 receiving the WUS may determine whether a UE-specific ID of the UE 101 is included in the WUS, and if so, proceed to participate in one or more POs. As such, RAN node 111 may manage/control, based on UE-specific IDs in WUSs, how many the number of UEs 101 that are to monitor a particular PO. As using UE-specific IDs in this manner may increase resource usage for some RAN scenarios, a UE-specific ID approach to managing POs may be better suited for certain types of network and/or conditions, such as Category M1 (CAT-M1) type systems with more PRBs available in a given subframe.

Given that the size of a UE identifier may be 40 bits for a S-TMSI, or the 64-bits for a IMSI (e.g., in case the TMSI has become invalid for whatever reason), the network (e.g., RAN node 111) may be strained for resources to generate a WUS message containing one or more S-TMSIs for all the UEs that may need to be paged. As such, RAN node 111 (and/or another device) may assign WUS group IDs to groups of UEs 101 based on (for example) the UE_IDs of UEs 101 (e.g., UE_ID mod Nw) where Nw is the size of the WUS group, is determined by the RAN node 111 (and/or another device) and is smaller than the size of the group of UEs 101 monitoring the POs to, for example, to reduce the probability of a UE receiving a WUS to monitor paging message not meant for itself.

UEs 101 receiving WUSs may determine whether a corresponding group ID is included in the WUS and proceed according (e.g., proceed to monitor one or more POs if/when the WUS include the group ID assigned to the UE). As such, RAN node 111 may manage and/or control the number of UEs 101 monitoring POs by assigning group IDs to UEs 101 (in a manner that ensures that each group is limited to a specified number of UEs 101) and including group IDs in WUS transmissions as appropriate.

In some embodiments, RAN node 111 may send multiple WUS for multiple groups of UEs 101 within the same WUS occasion. For instance, a WUS may consists only of the WUS preamble, which may be a sequence with good correlation properties such as a Zadoff-Chu (ZC) sequence. Additionally, assume that groups of UEs monitoring a WUS occasion are further divided into two subgroups. In such a scenario, there may be 2 groups of UEs 101 for each WUS occasion, each of which may be assigned a separate signal sequence, such as WUS Group 1 (WUSG1) and WUS Group 2 (WUSG2), and also a Go-to-sleep (GTS) signal that would be the same for both. In such a scenario, UE 101 may detect, from RAN node 111, a WUS corresponding to one of the following possibilities:

1) WUSG1+GTS: If only UEs 101 in WUSG1 are to be paged, RAN node 111 may transmit a combination of WUSG1 and GTS during the WUS occasion, and UEs 101 monitoring the WUS occasion may detect this signal and match it to their own group or to the GTS. When a particular UE 101 pertains to WUSG1, UE 101 may recognize the WUSG1 from the WUS and wake up to monitor the PDCCH. By contrast, if the UE 101 belongs to another group (e.g., WUSG2) UE 101 may go back to sleep due to the GTS indication of the WUS.
2) WUSG2+GTS: This may be handled by UE 101 in a similar manner as above, except that UEs 101 of WUSG2 may wake up while UEs 101 of WUSG1 may go back to sleep;
3) GTS: In case there is no wake up for any groups, RAN node 111 may transmit a GTS signal, which may indicate that any UEs 101 detecting the signal are to go back to sleep regardless of the group to which they may pertain; and
4) WUSG1+WUSG2: In this case, both groups of UEs 101 may respond to the WUS by waking up and proceeding to monitor one or more POs.

In some embodiments, among the benefits of using groups to manage and control which UEs 101 are to monitor one or more POs is that resources may be re-used for different groups while the wake-up frequency (the frequency with which a particular UE 101 may wake up) could be reduced, thus improving UE power savings, while keeping the resource allocation low (e.g., air interface resources within the specified bandwidth).

Additionally, or alternatively, RAN node 111 may manage and/or control the number of UEs 101 monitoring one or more POs by using different WUS sequences for different WUS group combinations (e.g., different combinations of UE groups) within a WUS occasion. For example, while RAN node 111 may transmit one WUS at a time, any given WUS may include an indication that corresponds to one or more groups of UEs 101 (also referred to as a WUS group combination). Assume that UEs 101 monitoring a given PO were sub-divided into 2 groups. Then, as 4 different combinations are possible 4 different sequences may\ be sent for each possibility (e.g., both groups receive WUS, neither receives WUS, only one of them receives WUS—and each of these situations then can be codified as a separate sequence for the WUS signal). For the UE 101 to know the different types of signals available for WUSs, and groups of UEs 101 to which the WUSs correspond, UE 101 may know them a-priori. For UE 101 to determine, recognize, identify, etc., the different types of signals available for WUSs and WUS groups (e.g., groups of UEs) to which they correspond, UE 101 may know them a-priori. For example, UE 101 may be able to map itself to the right group (e.g., a group of UEs, a WUS group that include one or more UEs 101 and/or UE groups, etc.) due to cell-specific parameters and other information that may be part of, for example, a system information message that carries information regarding the number of WUS groups within the cell. In some embodiments, the UE could map itself to either WUSG1 or WUSG2 by using an additional mod 2 parameter (depending on WUS group size parameter) defined for the given cell. That is, in some embodiments, how UE 101 may know which WUS group UE 101 belongs to may be done by using system information messages In some embodiments, UE 101 may determine whether a WUS applies to UE 101 by, for example, determining a WUS sequence (e.g., an identifier or other type of information) included in the WUS, map the WUS sequence to one or more groups of UEs 101, determine whether UE 101 pertains to one of those groups, and conclude based on the foregoing, whether the WUS applies to UE 101. The information for performing such operations (e.g., WUS sequence information, UE group of UE 101, information associating WUS sequence to UE groups, etc.) may have previously been received by UE 101 from RAN node 111 (e.g., as system information, via higher layer signaling, etc.).

In some embodiments, RAN node 111 may also, or alternatively, use different WUS resources for different WUS groups (e.g., different groups of UEs 101). In such embodiments, RAN node 111 may be able to transmit a WUS that only a particular group of UEs 101 may detect and responds to. This may enable UEs 101 of other groups (and therefore other WUS resources) to conserve power as such UEs 101 would have no need to participate in that particular WUS event.

Additional techniques, described herein, may help minimize WUS collisions, and other configuration issues, for UEs 101 (e.g., NB-IoT UEs 101 and eMTC UEs 101). Such techniques may help ensure that the configuration design for WUSs enables maximum power savings achievable and minimum configuration overhead—to better ensure a cleaner and simpler implementation of WUS services for NB-IoT UEs 101 and eMTC UEs 101. Techniques, described herein, also include solutions to help ensure backward compatibility to enable legacy (e.g., LTE) UEs 101 to participate, and engage, in the techniques and benefits described herein.

In some embodiments, when a WUS collides with subframes, such as subframes corresponding to a narrowband primary synchronization signal (NPSS), narrowband secondary synchronization signal (NPSS), Narrowband Physical Broadcasting Channel (NPBCH), SIB1-NB, etc., the WUS may be postponed to the next valid subframe. Since the location of the above signals is known a priori by UE 101, UE 101 may figure out the starting point of the WUS (e.g., NPSS/PSS and NSSS/SSS may be fixed signals, their location within a LTE PDCCH may be well-known and so is the frequency of their arrival. However, if the WUS collides with a PO, then there may be other issues, such has whether the WUS or PO may be postponed.

For NB-IoT UEs 101, it has been proposed that to reduce the impact of cell reference measurements, the measurements are skipped for x-1 out of x DRX cycles and the WUS/DTX (e.g., discontinuous transmission of WUS) can still be an option without using existing synchronization signals. However, this may have consequences, the first being delayed detection of mobility. The problem is that since the WUS may be DTX, it may be difficult for UE 101 to detect that UE 101 has missed paging due to the WUS being DTX or due to UE 101 having moved to a different cell. If UE 101 is largely stationary, then this is not a big concern. However, if UE 101 is not stationary, then this behavior can result in much higher rates of paging misdetections as UE 101 may have moved to a different cell, but may not know it until UE 101 performs cell measurements.

Thus, if there was a WUS that was sent right after UE 101 moved to a different cell, UE 101 may have missed the WUS. MME 121 generally sends the S1-AP message to the last RAN node 111 where UE 101 was reported to be in as its serving cell. Having missed the WUS, the MME's paging retransmission timer (e.g., T3413 or T3415 (in case of extended DRX cycle)) may time out, causing MME 121 to retransmit the paging message over S1-AP again, this time to all RAN nodes 111 within the tracking area. In this case, since UE 101 may not be aligned with UE's new cell parameters, it is likely that UE 101 may miss the new WUS as well. While the paging retransmission timer is network-dependent, due to the high load incurred in doing a flood paging message, MME 121 may avoid multiple retransmissions of this message for a single UE 101, and thus UE 101 may miss paging transmissions altogether if UE 101 becomes mobile.

With respect to UE 101 determining an offset gap between the WUS and configured PO, assume that the parameters of a maximum WUS duration and a minimum offset between WUS and PO are cell-specific, and broadcast in the system information. In that case, for UE 101 may determine the starting subframe of the WUS by calculating the PO location and working backwards from the PO location to subtract the maximum WUS duration and the configured minimum offset. If this location falls on an invalid subframe, UE 101 may determine the start location of the WUS by finding the first valid subframe after this calculated location. UE 101 may determine the start position of the WUS using the value of the maximum transmitted WUS duration and a minimum non-zero gap. If the WUS gap offset is configured explicitly, it may be possible that RAN node 111 may not be able to guarantee the precise value of this gap as the starting location of the WUS may collide with an invalid subframe and therefore must be postponed, thus affecting the value of the gap. However, in this case, as the transmitted duration of the WUS can be shorter than the maximum configured duration, the requisite flexibility may be assumed with respect to maintaining the minimum gap (e.g., the actual gap can be bigger than the explicitly defined minimum gap).

As described herein, RAN node 111 may configure the maximum WUS duration to be at least 1 level above a maximum coverage level presumed, to account for invalid subframes. Additionally, or alternatively, RAN node 111 may signal a minimum non-zero gap that RAN node 111 may support between the end of the maximum WUS duration and the start of the PO. The actual gap may be larger than this minimum nonzero gap since the actual transmitted duration of the WUS may be shorter than the maximum configured duration, depending on the coverage level of the UE that is being paged.

Figure 6:
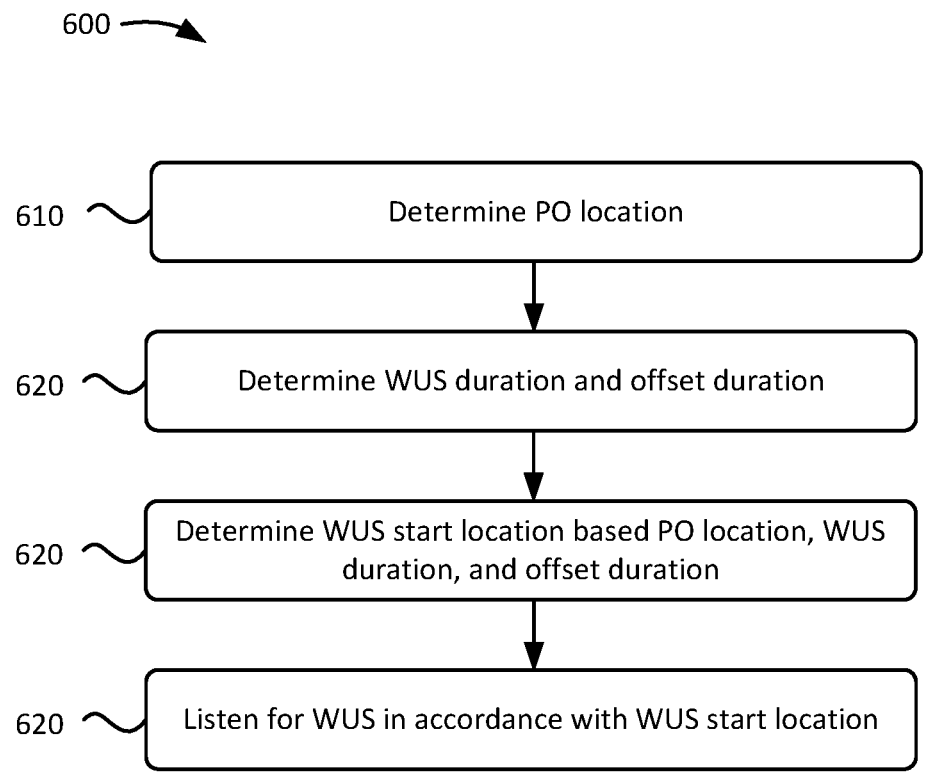
FIG. 6 is a flowchart diagram of an example process for determining a WUS location.

FIG. 6 is a flowchart diagram of an example process 600 for determining a WUS location. Process 600 may be performed by UE 101. In some embodiments, one or more of the operations described in FIG. 6 may be performed in whole, or in part, by another device, such as one or more of the devices described above with reference to FIG. 1. Additionally, the example of FIG. 6 is provided as a non-limiting example. In practice, the example of FIG. 6 may include fewer, additional, and/or alternative, operations and/or functions.

As shown, process 600 may include determining a PO location (block 610). For example, UE 101 may receive system information (e.g., SIBs) from RAN node 111, which may include one or more types of IEs and configuration information for communicating with RAN node 111. UE 101 may determine a PO location (e.g., based on the configuration information for RAN node 111.

Process 600 may also include determining a WUS duration and an offset duration (block 620). For example, UE 101 may determine a maximum WUS duration, which may include a maximum duration for monitoring a channel for a WUS from RAN node 111. In addition, UE 101 may determine a minimum offset duration, which may include a least amount of time estimated to effectively transition from receiving a WUS (and/or after expiration of the WUS duration) to listening to a PO for a paging message. In some embodiments, the WUS duration and/or offset duration may be implicitly or explicitly provided by RAN node 111. For example, RAN node 111 may explicitly provide UE 101 with a minimum offset duration via system information (e.g., one or more SIBs).

Process 600 may include determining a WUS start point based on the PO location, WUS duration, and offset duration (block 630). For example, UE 101 may determine a start point for the WUS duration by subtracting an amount of time (and/or resources) that is equal to the WUS duration (e.g., maximum WUS duration) and the offset duration (e.g., minimum offset duration) from a location (e.g., the start point) of the PO. Upon determining a start point for the WUS, UE 111 may listen for a WUS from RAN node 111 for the duration of the WUS duration In some embodiments, the WUS may collide with known signals such as a narrowband primary synchronization signal (NPSS), narrowband secondary synchronization signal (NPSS), Narrowband Physical Broadcasting Channel (NPBCH), SIB1-NB, and/or other SI messages. However, the location of such signals may be known to the UE a-priori by reading cell parameters before going to IDLE state. However, the location of all POs within the system may not be known to UE 101 as a PO location may depend on a UE_ID and other cell-based parameters, such as defaultPagingCycle (T), nB, Ns, etc.

Figure 7:
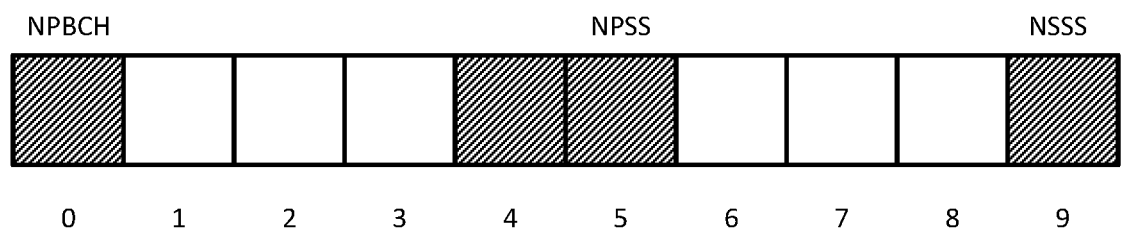
FIG. 7 is a diagram of an example paging frame in accordance with the embodiments described herein.

FIG. 7 is a diagram of an example paging frame 700 in accordance with the embodiments described herein. As shown, paging frame 700 may include subframes 1-10, one or more of which may correspond to a NPBCH, NPSS, NSSS, etc. Additionally, subframes 0, 4, 5, and 9 may include possible paging subframes for NB-IoT UEs 101 and/or eMTC UEs 101. In some embodiments, subframes 0, 4, 5, and 9 may be configured for sending POs, but as can be seen from the figure subframes 0, 5 and 9 also may receive the NPBCH, NPSS and NSSS, respectively. Additionally, the SIB1-NB and other SI messages may be scheduled anywhere within the remaining subframes. This may increase the chances that the PO may be moved to the next valid subframe (e.g., subframe 1 or 6). In this case, the scheduling possibilities for the WUS may become narrow, and may most likely be scheduled in either subframe 3 or subframe 8, for least likely collision possibilities with another PO.

In some embodiments, to help avoid the WUS colliding with the PO, RAN node 111 may cause the WUS to be configured to be transmitted in subframes 3 and 8. To calculate the WUS starting frame, RAN node 111 may calculate the PO location nearest to the maximum WUS duration+a nonzero minimum offset (e.g., the WUS Frame). Additionally, SF=PF−(Config. Max WUS duration+Min. Gap). Additionally, if SF<0, then WUS Frame=1024+SF, and the WUS subframe may be denoted by another parameter, namely Ws, which could be either 3 or 8. SF may be a WUS starting frame; PF may be a paging frame; and Min. Gap may be the offset configured by RAN node 111. Ws may be used for PO subframes to describe which subframes within a PF could be POs In some embodiments, RAN node 111 may minimize collision of WUS with PO by ensuring that the WUS is transmitted on non-anchor carriers since that may help ensure that the PO does not collide with SI messages and thus, the PO is not postponed to other subframes where the WUS may be transmitted. This approach may not work for standalone or guard-band deployments. In some embodiments, a fallback procedure to WUS and PO colliding is that if/when the WUS and PO are scheduled in the same subframe, then the WUS is punctured by the PO to ensure that legacy (e.g., LTE) UEs may detect the paging message correctly as there may be no way a WUS-enabled UE can correctly predict that the PO is being sent at the same time as the WUS, since the PO may be for some other UE 101 altogether. Another potential collision problem that may occur for eMTC UEs 101 is the problem of the WUS colliding with the RSS. In this case, since the RSS may be a long burst of a signal and its location is well-known, the recommendation is to puncture the RSS and send the WUS.

For the case where UE 101 may miss a paging message (or PO) due to delayed identification of change in cells, MME 121 may retransmit (or cause RAN node 111 to retransmit) the paging message taking into account the following: 1) UE's WUS capability and the number of DRX cycles it skips before transmitting the WUS message (if MME 121 can directly take in to account UE's capabilities); and 2) when RAN node 111 receives a paging message from MME 121, RAN node 111 may send a new message to MME 121 (over a S1-AP link) giving MME 121 the following information: a) UE 101 is WUS-capable; and b) RAN node 111 is (or is not) WUS-capable.

Figure 8:
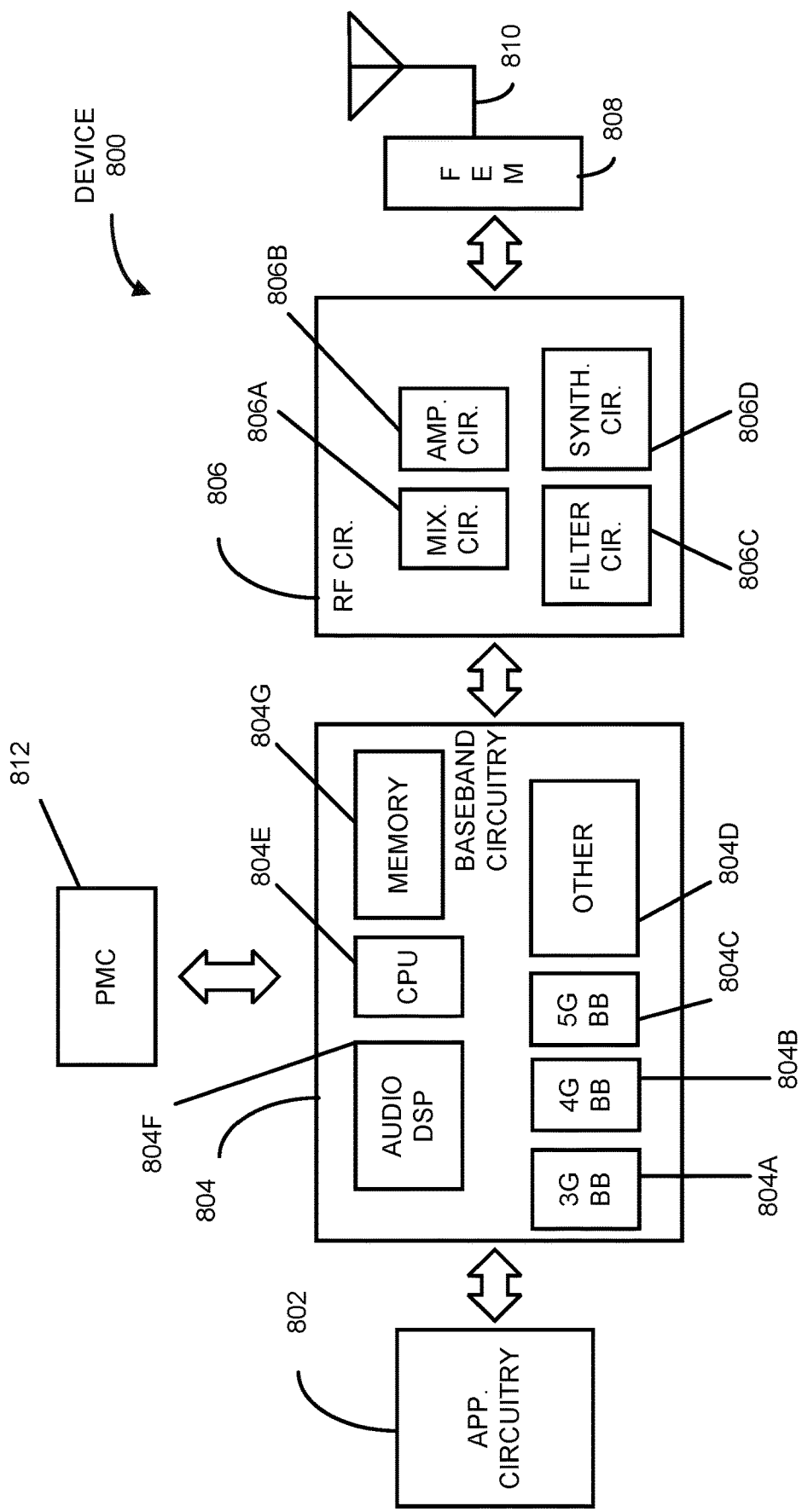
FIG. 8 is a block diagram of example components of a device in accordance with some embodiments.

In some embodiments, since UE 101 is WUS-capable and skips N DRX cycles, either because there is 1-N mapping of WUS to N POs, because UE 101 is configured to not perform RRM measurements for N DRX cycles, etc., MME 121 may be made aware to adjust the paging retransmission strategy accordingly (e.g., by limiting the number of short spaced retransmissions) if there are few paging opportunities in a PTW FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), preceding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
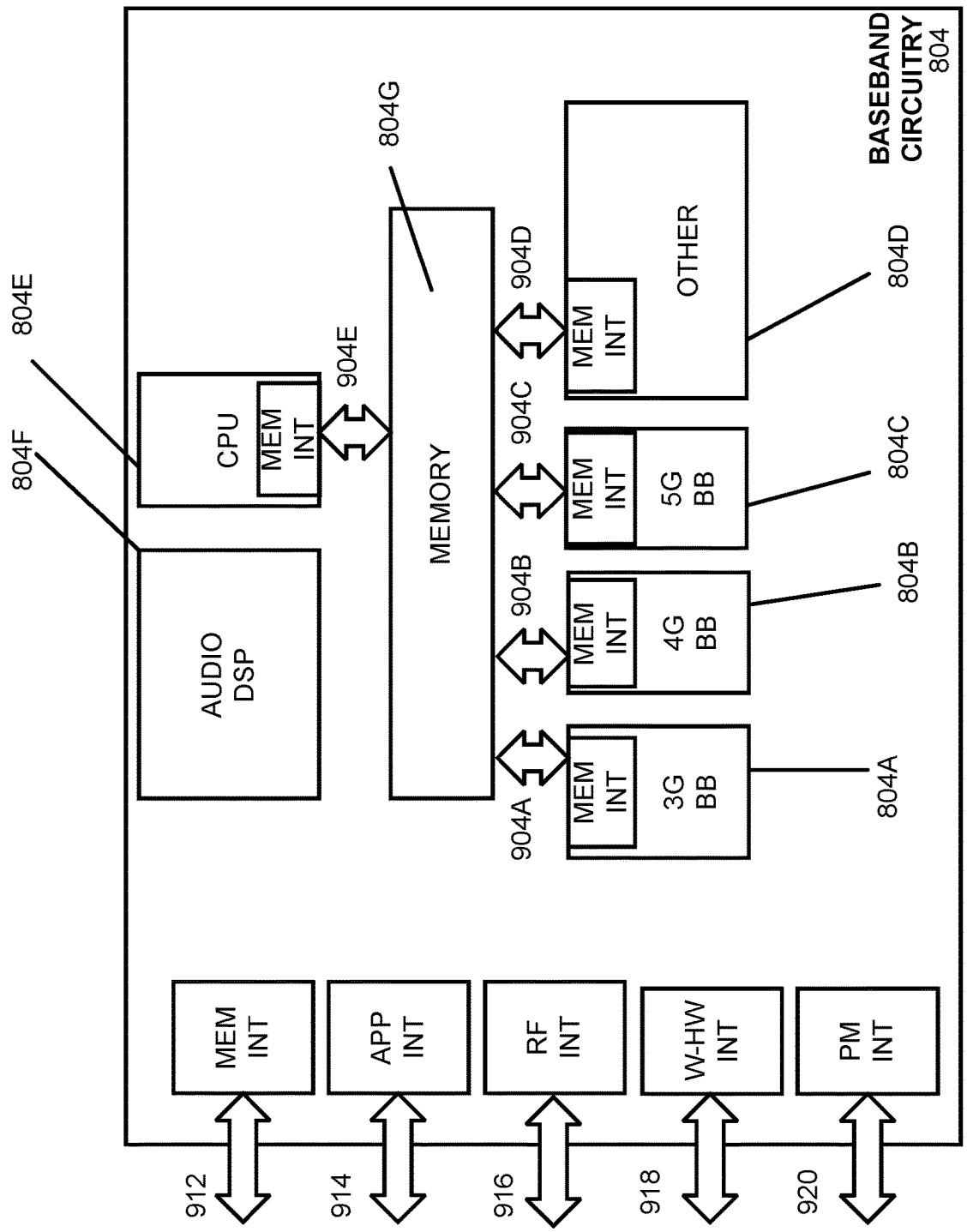
FIG. 9 is a block diagram of example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-1404E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
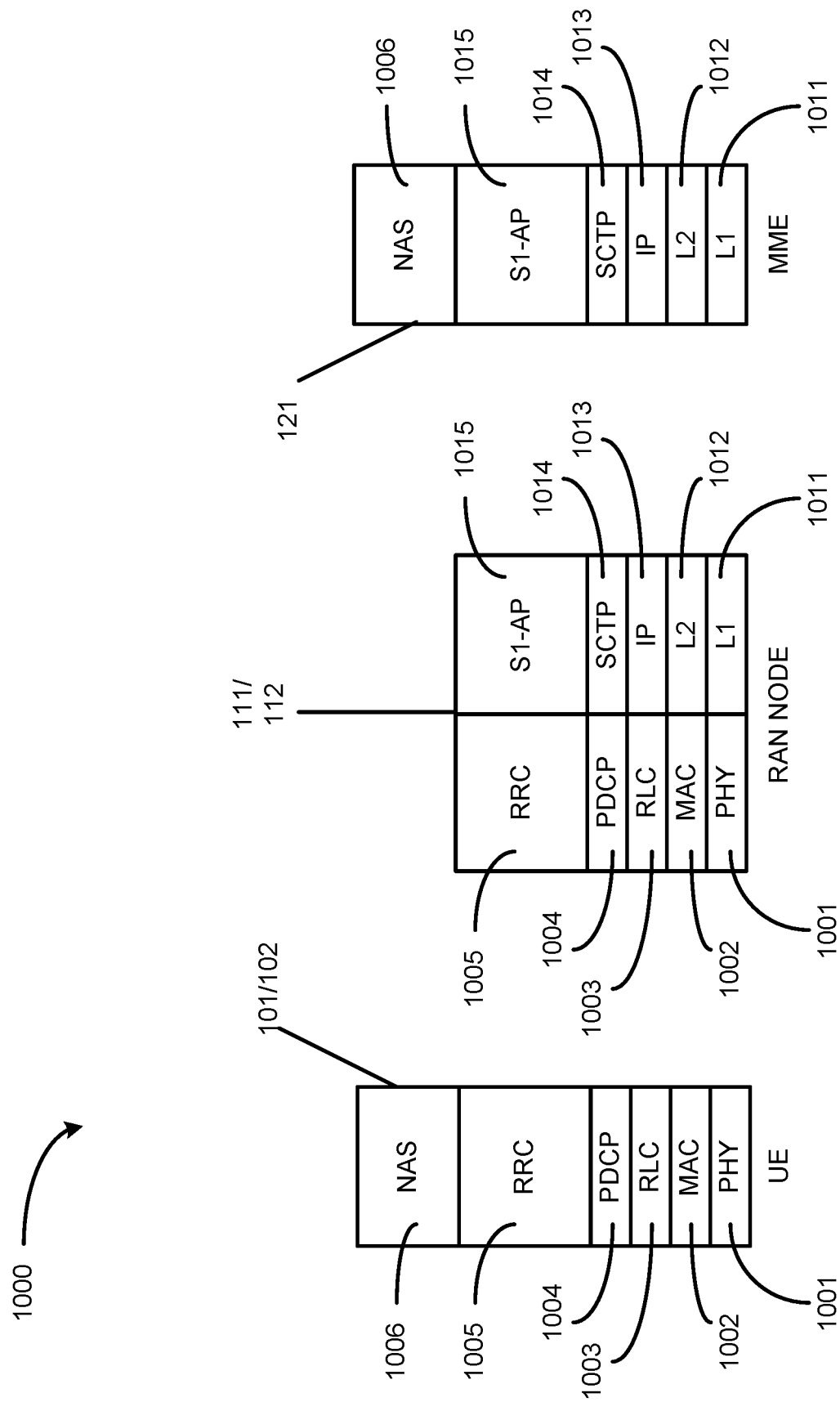
FIG. 10 is a block diagram of an example control plane protocol stack in accordance with some embodiments.

FIG. 10 is an illustration of a control plane protocol stack in accordance with some embodiments. In this embodiment, a control plane 1000 is shown as a communications protocol stack between the UE 101 (or alternatively, the UE 102), the RAN node 111 (or alternatively, the RAN node 112), and the MME 121.

The PHY layer 1001 may transmit or receive information used by the MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as the RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1002 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1003 may operate in a plurality of modes of operation, including: Transparent Mode (TM), Unacknowledged Mode (UM), and Acknowledged Mode (AM). The RLC layer 1003 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1001, the MAC layer 1002, the RLC layer 1003, the PDCP layer 1004, and the RRC layer 1005.

The non-access stratum (NAS) protocols 1006 form the highest stratum of the control plane between the UE 101 and the MME 121. The NAS protocols 1006 support the mobility of the UE 101 and the session management procedures to establish and maintain IP connectivity between the UE 101 and the P-GW 123.

The S1 Application Protocol (S1-AP) layer 1015 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1014 may ensure reliable delivery of signaling messages between the RAN node 111 and the MME 121 based, in part, on the IP protocol, supported by the IP layer 108. The L2 layer 1012 and the L1 layer 1011 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1011, the L2 layer 1012, the IP layer 108, the SCTP layer 1014, and the S1-AP layer 1015.

Figure 11:
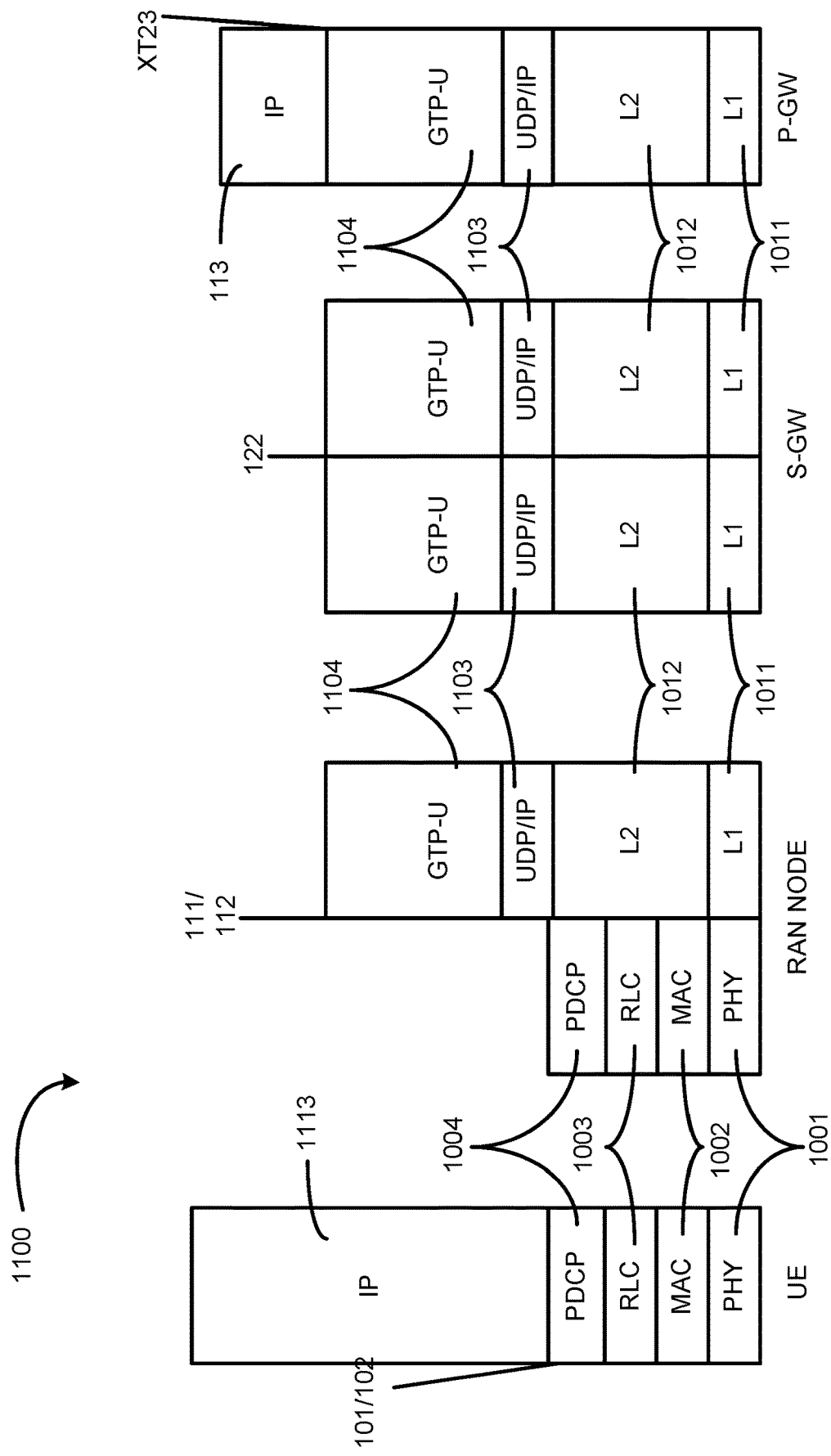
FIG. 11 is a block diagram of an example user plane protocol stack in accordance with some embodiments.

FIG. 11 is an illustration of a user plane protocol stack in accordance with some embodiments. In this embodiment, a user plane 1100 is shown as a communications protocol stack between the UE 101 (or alternatively, the UE 102), the RAN node 111 (or alternatively, the RAN node 112), the S-GW 122, and the P-GW 123. The user plane 1100 may utilize at least some of the same protocol layers as the control plane 1000. For example, the UE 101 and the RAN node 111 may utilize a Uu interface (e.g., an LTE-Uu interface) to exchange user plane data via a protocol stack comprising the PHY layer 1001, the MAC layer 1002, the RLC layer 1003, the PDCP layer 1004.

The General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. The UDP and IP security (UDP/IP) layer 1103 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1011, the L2 layer 1012, the UDP/IP layer 1103, and the GTP-U layer 1104. The S-GW 122 and the P-GW 123 may utilize an S5/S8a interface to exchange user plane data via a protocol stack comprising the L1 layer 1011, the L2 layer 1012, the UDP/IP layer 1103, and the GTP-U layer 1104. As discussed above with respect to FIG. 10, NAS protocols support the mobility of the UE 101 and the session management procedures to establish and maintain IP connectivity between the UE 101 and the P-GW 123.

Figure 12:
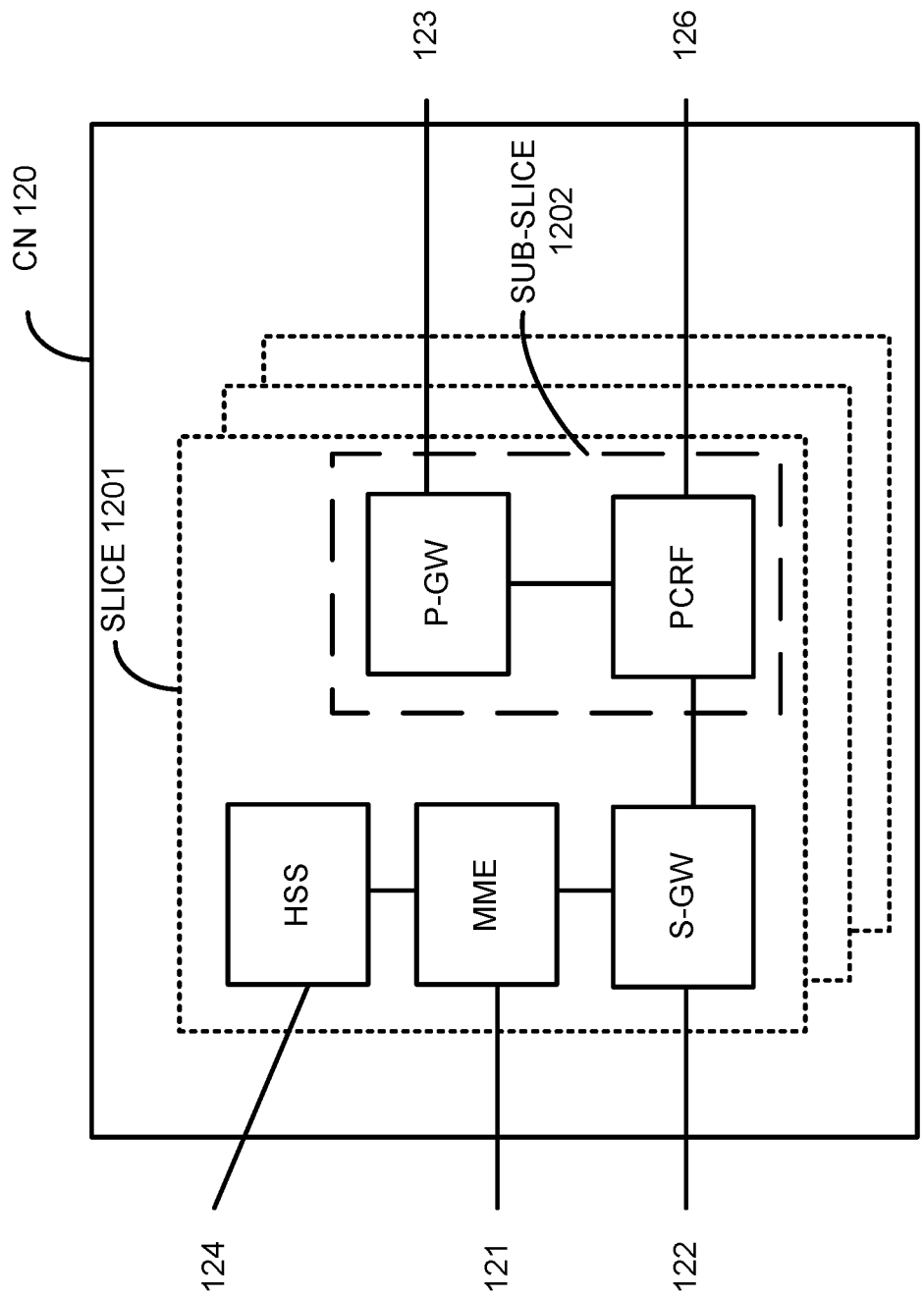
FIG. 12 illustrates components of a core network in accordance with some embodiments.

FIG. 12 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 1201. A logical instantiation of a portion of the CN 120 may be referred to as a network sub-slice 1202 (e.g., the network sub-slice 1202 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
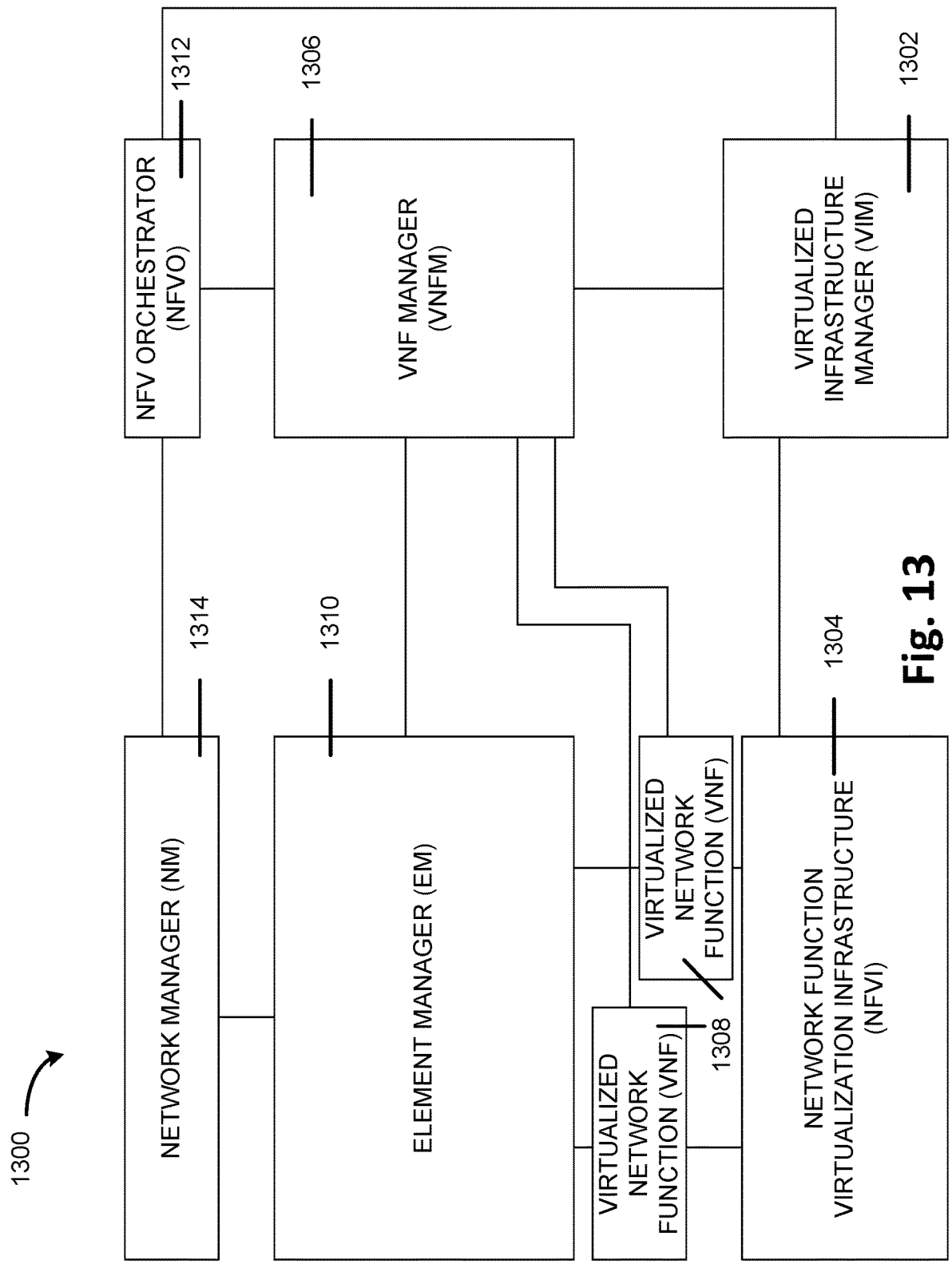
FIG. 13 is a block diagram illustrating components, according to some example embodiments, of a system to support Network Functions Virtualization (NFV)

FIG. 13 is a block diagram illustrating components, according to some example embodiments, of a system 1300 to support NFV. The system 1300 is illustrated as including a virtualized infrastructure manager (VIM) 1302, a network function virtualization infrastructure (NFVI) 1304, a VNF manager (VNFM) 1306, virtualized network functions (VNFs) 1308, an element manager (EM) 1310, an NFV Orchestrator (NFVO) 1312, and a network manager (NM) 1314.

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1306 may manage the VNFs 1308. The VNFs 1308 may be used to execute EPC components/functions. The VNFM 1306 may manage the life cycle of the VNFs 1308 and track performance, fault and security of the virtual aspects of VNFs 1308. The EM 1310 may track the performance, fault and security of the functional aspects of VNFs 1308. The tracking data from the VNFM 1306 and the EM 1310 may comprise, for example, performance measurement (PM) data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
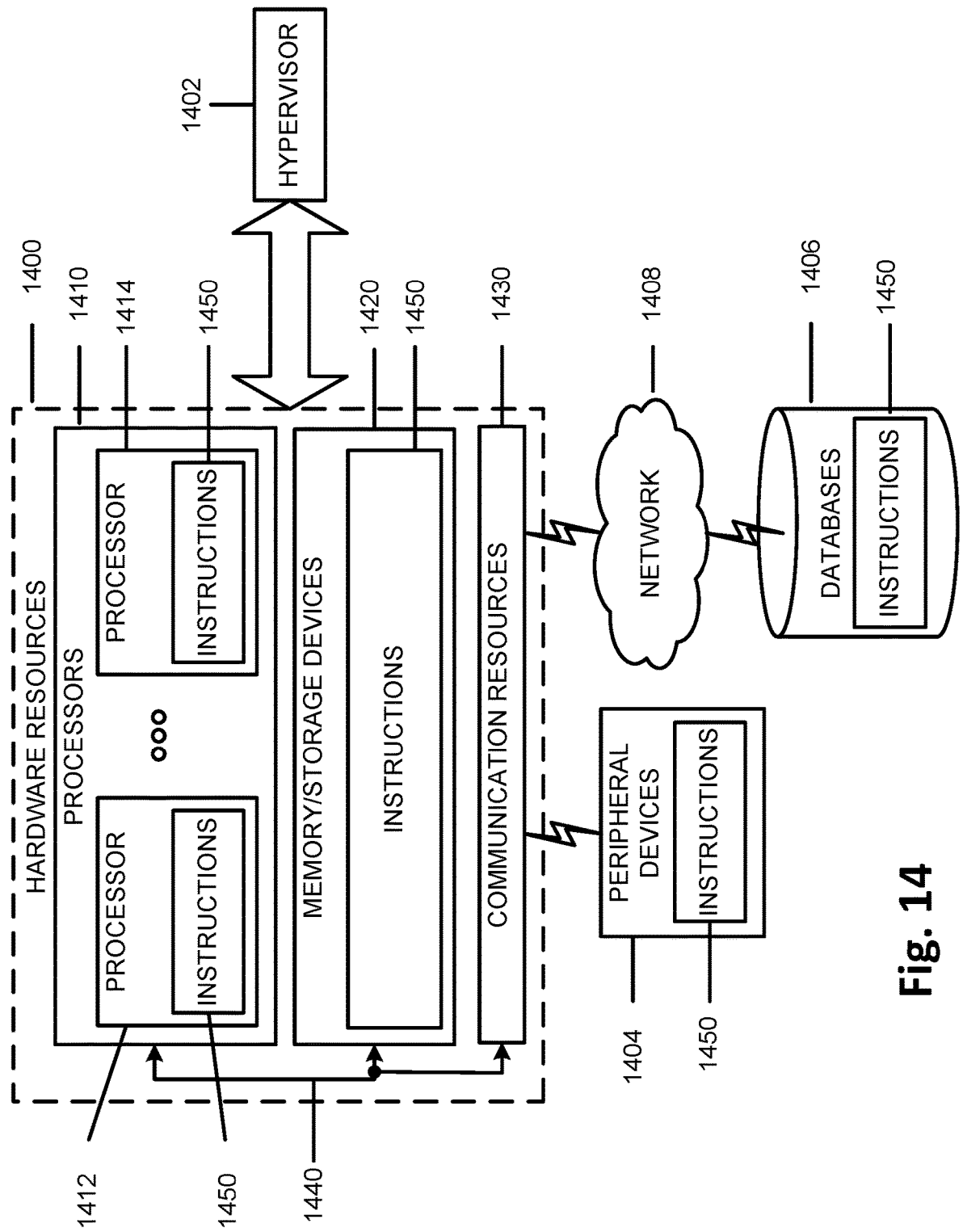
FIG. 14 is a block diagram of example components, according to some example embodiments, able to read instructions from a machine-readable or computer-readable medium (e.g., a non-transitory machine-readable storage medium) and perform any one or more of the methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For embodiments where node virtualization (e.g., NFV) is utilized, a hypervisor 1402 may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable medias.

A number of examples, relating to embodiments of the techniques described above, will next be given.

In a first example, an apparatus of a Mobility Management Entity (MME), comprising: a computer-readable medium containing processing instructions; and one or more processors, to execute the processing instructions to: estimate, based on information stored in the computer-readable medium, a coverage enhancement (CE) level of a user equipment (UE); determine, based on the CE level, a number of repetitions for a wake up signal (WUS) for the UE; and cause a WUS for UE to be transmitted to a radio access network (RAN) node corresponding to the UE.

In example 2, the subject matter of example 1, or any of the examples herein, wherein the number of repetitions pertains to a machine type communication (MTC) physical downlink control channel (MPDCCH).

In example 3, the subject matter of example 1, or any of the examples herein, wherein the number of repetitions pertains to a narrowband physical downlink control channel (NPDCCH).

In example 4, the subject matter of example 1, or any of the examples herein, wherein the MME provides the estimated number of repetitions required for WUS in S1 application protocol (S1AP) paging message to the RAN node.

In example 5, the subject matter of example 1, or any of the examples herein, wherein the MME provides the estimated number of repetitions required for WUS via a UE paging coverage information message.

In example 6, the subject matter of example 1, or any of the examples herein, wherein the MME uses UEPagingCoverageInformation or UERadioAccessCapabilityInformation to exchange information with the RAN node.

In a seventh example, an apparatus of a radio access network (RAN) node, comprising: an interface to radio frequency (RF) circuitry; and one or more processors that are controlled to: determine to disable a wake up signal (WUS) feature of the RAN node; inform, via the interface to the RF circuitry, a mobility management entity (MME) that the RAN node has disabled the WUS feature; and cause, via the interface to the RF circuitry, system information to be broadcast to user equipment (UE) in IDLE mode, indicating that the WUS feature of RAN node has been disabled.

In example 8, the subject matter of example 1, or any of the examples herein, wherein the one or more processors are to determine to disable the WUS feature based on network congestion.

In example 9, the subject matter of example 1, or any of the examples herein, wherein the one or more processors are to determine to disable the WUS feature in response to a change in system information corresponding to the RAN node.

In example 10, the subject matter of example 1, or any of the examples herein, wherein the one or more processors are to determine to disable the WUS feature in response to a change in extended access barring at least one parameter in system information block 14 (SIB-14).

In example 11, the subject matter of example 1, or any of the examples herein, wherein the one or more processors are to cause a paging message to indicate that the WUS feature is disabled.

In example 12, the subject matter of example 1, or any of the examples herein, wherein the one or more processors are to cause a paging radio network temporary identifier (P-RNTI) to indicate that the WUS feature is disabled.

In a thirteenth example, an apparatus of a User Equipment (UE), comprising: an interface to radio frequency (RF) circuitry; and one or more processors that are controlled to: determine a paging occasion (PO) for the UE; determine a maximum wake up signal (WUS) duration; determine a minimum offset for the UE; and determine a start location of the WUS by subtracting the maximum WUS duration and the minimum offset from the PO for the UE.

In example 14, the subject matter of example 1, or any of the examples herein, wherein the minimum offset for the UE is configured explicitly based on signaling from a radio access network node (RAN) node.

In a fifteenth example, a computer-readable medium containing program instructions for causing one or more processors, associated with a Mobility Management Entity (MME), to: estimate, based on information stored in the computer-readable medium, a coverage enhancement (CE) level of a user equipment (UE); determine, based on the CE level, a number of repetitions for a wake up signal (WUS) for the UE; and cause a WUS for UE to be transmitted to a radio access network (RAN) node corresponding to the UE.

In example 16, the subject matter of example 1, or any of the examples herein, wherein the number of repetitions pertains to a machine type communication (MTC) physical downlink control channel (MPDCCH).

In example 17, the subject matter of example 1, or any of the examples herein, wherein the number of repetitions pertains to a narrowband physical downlink control channel (NPDCCH).

In example 18, the subject matter of example 1, or any of the examples herein, wherein the MME provides the estimated number of repetitions required for WUS in S1 application protocol (S1AP) paging message to the RAN node.

In example 19, the subject matter of example 1, or any of the examples herein, wherein the MME provides the estimated number of repetitions required for WUS via a UE paging coverage information message.

In example 20, the subject matter of example 1, or any of the examples herein, wherein the MME uses UEPagingCoverageInformation or UERadioAccessCapabilityInformation to exchange information with the RAN node.

In a twenty first example, a computer-readable medium containing program instructions for causing one or more processors, associated with a Radio Access Network (RAN) node, to: determine to disable a wake up signal (WUS) feature of the RAN node; inform, via the interface to the RF circuitry, a mobility management entity (MME) that the RAN node has disabled the WUS feature; and cause, via the interface to the RF circuitry, system information to be broadcast to user equipment (UE) in IDLE mode, indicating that the WUS feature of RAN node has been disabled.

In example 22, the subject matter of example 1, or any of the examples herein, wherein the one or more processors are to determine to disable the WUS feature based on network congestion.

In example 23, the subject matter of example 1, or any of the examples herein, wherein the one or more processors are to determine to disable the WUS feature in response to a change in system information corresponding to the RAN node.

In example 24, the subject matter of example 1, or any of the examples herein, wherein the one or more processors are to determine to disable the WUS feature in response to a change in extended access barring at least one parameter in system information block 14 (SIB-14).

In example 25, the subject matter of example 1, or any of the examples herein, wherein the one or more processors are to cause a paging message to indicate that the WUS feature is disabled.

In example 26, the subject matter of example 1, or any of the examples herein, wherein the one or more processors are to cause a paging radio network temporary identifier (P-RNTI) to indicate that the WUS feature is disabled.

In a twenty seventh example, a computer-readable medium containing program instructions for causing one or more processors, associated with a User Equipment (UE), to: determine a paging occasion (PO) for the UE; determine a maximum wake up signal (WUS) duration; determine a minimum offset for the UE; and determine a start location of the WUS by subtracting the maximum WUS duration and the minimum offset from the PO for the UE.

In example 28, the subject matter of example 1, or any of the examples herein, wherein the minimum offset for the UE is configured explicitly based on signaling from a radio access network node (RAN) node.

In a twenty-ninth example, an apparatus of a Mobility Management Entity (MME), comprising: means for estimating, based on information stored in the computer-readable medium, a coverage enhancement (CE) level of a user equipment (UE); means for determining, based on the CE level, a number of repetitions for a wake up signal (WUS) for the UE; and means for causing a WUS for UE to be transmitted to a radio access network (RAN) node corresponding to the UE.

In example 30, the subject matter of example 1, or any of the examples herein, wherein the number of repetitions pertains to a machine type communication (MTC) physical downlink control channel (MPDCCH).

In example 31, the subject matter of example 1, or any of the examples herein, wherein the number of repetitions pertains to a narrowband physical downlink control channel (NPDCCH).

In example 32, the subject matter of example 1, or any of the examples herein, wherein the MME provides the estimated number of repetitions required for WUS in S1 application protocol (S1AP) paging message to the RAN node.

In example 33, the subject matter of example 1, or any of the examples herein, wherein the MME uses UEPagingCoverageInformation or UERadioAccessCapabilityInformation to exchange information with the RAN node.

In a thirty-fourth example, a method, performed by an apparatus of an Mobility Management Entity (MME), comprising: determining to disable a wake up signal (WUS) feature of the RAN node; informing, via the interface to the RF circuitry, a mobility management entity (MME) that the RAN node has disabled the WUS feature; and causing, via the interface to the RF circuitry, system information to be broadcast to user equipment (UE) in IDLE mode, indicating that the WUS feature of RAN node has been disabled.

In example 35, the subject matter of example 1, or any of the examples herein, wherein the one or more processors are to determine to disable the WUS feature based on network congestion.

In example 36, the subject matter of example 1, or any of the examples herein, wherein the one or more processors are to determine to disable the WUS feature in response to a change in system information corresponding to the RAN node.

In example 37, the subject matter of example 1, or any of the examples herein, wherein the one or more processors are to determine to disable the WUS feature in response to a change in extended access barring at least one parameter in system information block 14 (SIB-14).

In example 38, the subject matter of example 1, or any of the examples herein, wherein the one or more processors are to cause a paging message to indicate that the WUS feature is disabled.

In example 39, the subject matter of example 1, or any of the examples herein, wherein the one or more processors are to cause a paging radio network temporary identifier (P-RNTI) to indicate that the WUS feature is disabled.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2 and 6 the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus of a Mobility Management Entity (MME), comprising:
   a computer-readable medium containing processing instructions; and
   one or more processors, to execute the processing instructions to:
   estimate, based on information stored in the computer-readable medium, a coverage enhancement (CE) level of a user equipment (UE);
   determine, based on the CE level, a number of repetitions for a wake up signal (WUS) for the UE; and
   cause a WUS for UE to be transmitted to a radio access network (RAN) node corresponding to the UE, wherein the MME provides the estimated number of repetitions required for WUS in S1 application protocol (S1AP) paging message to the RAN node.

2. The MME of claim 1, wherein the number of repetitions pertains to a machine type communication (MTC) physical downlink control channel (MPDCCH).

3. The MME of claim 1, wherein the number of repetitions pertains to a narrowband physical downlink control channel (NPDCCH).

4. The MME of claim 1, wherein the MME provides the estimated number of repetitions required for WUS via a UE paging coverage information message.

5. The MME of claim 1, wherein the MME uses UEPagingCoverageInformation or UERadioAccessCapabilityInformation to exchange information with the RAN node.

6. An apparatus of a radio access network (RAN) node, comprising:
   an interface to radio frequency (RF) circuitry; and
   one or more processors that are controlled to:
   determine to disable a wake up signal (WUS) feature of the RAN node;
   inform, via the interface to the RF circuitry, a mobility management entity (MME) that the RAN node has disabled the WUS feature; and
   cause, via the interface to the RF circuitry, system information to be broadcast to user equipment (UE) in IDLE mode, indicating that the WUS feature of RAN node has been disabled, wherein the one or more processors are to cause a paging message to indicate that the WUS feature is disabled.

7. The apparatus of claim 6, wherein the one or more processors are to determine to disable the WUS feature based on network congestion.

8. The apparatus of claim 6, wherein the one or more processors are to determine to disable the WUS feature in response to a change in system information corresponding to the RAN node.

9. The apparatus of claim 6, wherein the one or more processors are to determine to disable the WUS feature in response to a change in extended access barring at least one parameter in system information block 14 (SIB-14).

10. The apparatus of claim 6, wherein the one or more processors are to cause a paging radio network temporary identifier (P-RNTI) to indicate that the WUS feature is disabled.

11. An apparatus of a User Equipment (UE), comprising:
    an interface to radio frequency (RF) circuitry; and
    one or more processors that are controlled to:
    determine a paging occasion (PO) for the UE;
    determine a maximum wake up signal (WUS) duration;
    determine a offset for the UE;
    determine a start location of the WUS by subtracting the maximum WUS duration and the offset from the PO for the UE; and
    receive, while in IDLE mode, system information indicating that a WUS feature of a RAN node has been disabled.

12. The apparatus of claim 11, wherein the minimum offset for the UE is configured explicitly based on signaling from a radio access network node (RAN) node.

13. A non-transitory computer-readable medium containing program instructions for causing one or more processors, associated with a Mobility Management Entity (MME), to:
    estimate, based on information stored in the computer-readable medium, a coverage enhancement (CE) level of a user equipment (UE);
    determine, based on the CE level, a number of repetitions for a wake up signal (WUS) for the UE; and
    cause a WUS for UE to be transmitted to a radio access network (RAN) node corresponding to the UE,
    wherein the MME provides the estimated number of repetitions required for WUS in S1 application protocol (S1AP) paging message to the RAN node.

14. The non-transitory computer-readable medium of 13, wherein the number of repetitions pertains to a machine type communication (MTC) physical downlink control channel (MPDCCH).

15. The non-transitory computer-readable medium of 13, wherein the number of repetitions pertains to a narrowband physical downlink control channel (NPDCCH).

16. The non-transitory computer-readable medium of claim 13, wherein the MME provides the estimated number of repetitions required for WUS via a UE paging coverage information message.

17. The non-transitory computer-readable medium of claim 13, wherein the MME uses UEPagingCoverageInformation or UERadioAccessCapabilityInformation to exchange information with the RAN node.

18. A non-transitory computer-readable medium containing program instructions for causing one or more processors, associated with a Radio Access Network (RAN) node, to:
    determine to disable a wake up signal (WUS) feature of the RAN node;

inform, via the interface to the RF circuitry, a mobility management entity (MME) that the RAN node has disabled the WUS feature; and cause, via the interface to the RF circuitry, system information to be broadcast to user equipment (UE) in IDLE mode, indicating that the WUS feature of RAN node has been disabled, wherein the one or more processors are to determine to disable the WUS feature in response to a change in extended access barring at least one parameter in system information block 14 (SIB-14).

19. The non-transitory computer-readable medium claim 18, wherein the one or more processors are to determine to disable the WUS feature based on network congestion.

20. The non-transitory computer-readable medium of claim 18, wherein the one or more processors are to determine to disable the WUS feature in response to a change in system information corresponding to the RAN node.

21. The non-transitory computer-readable medium claim 18, wherein the one or more processors are to cause a paging message to indicate that the WUS feature is disabled.

* * * * *